(12) United States Patent
Ohno et al.

(10) Patent No.: US 7,473,465 B2
(45) Date of Patent: Jan. 6, 2009

(54) HONEYCOMB STRUCTURE, POROUS BODY, PORE FORMING MATERIAL FOR THE POROUS BODY, AND METHODS FOR MANUFACTURING THE PORE FORMING MATERIAL, THE POROUS BODY AND THE HONEYCOMB STRUCTURE

(75) Inventors: Kazushige Ohno, Ibi-gun (JP); Hiroki Sato, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/450,460

(22) Filed: Jun. 12, 2006

(65) Prior Publication Data

US 2006/0228521 A1    Oct. 12, 2006

Related U.S. Application Data

(62) Division of application No. 11/033,151, filed on Jan. 12, 2005, now Pat. No. 7,387,829.

(30) Foreign Application Priority Data

Jan. 13, 2004    (JP)    ............................ 2004-006152

(51) Int. Cl.
 *C04B 38/06* (2006.01)
(52) U.S. Cl. .............. 428/307.7; 428/313.5; 428/313.9; 428/325; 428/327
(58) Field of Classification Search .............. 428/304.4, 428/306.6, 307.7, 313.3, 313.5, 313.9, 323, 428/325, 327
See application file for complete search history.

(56) References Cited

U.S. PATENT DOCUMENTS

| 4,613,643 | A | 9/1986 | Nakamura et al. |
| 5,914,187 | A | 6/1999 | Naruse et al. |
| 5,930,994 | A | 8/1999 | Shimato et al. |

(Continued)

FOREIGN PATENT DOCUMENTS

EP    0 736 503 A1    10/1996

(Continued)

OTHER PUBLICATIONS

U.S. Appl. No. 10/129,126.

(Continued)

*Primary Examiner*—John J. Zimmerman
*Assistant Examiner*—Aaron Austin
(74) *Attorney, Agent, or Firm*—Oblon, Spivak, McClelland, Maier & Neustadt, P.C.

(57) ABSTRACT

A porous body includes skeleton particles directly binding with each other and forming inner surfaces and void spaces, each of the skeleton particles being one of a nitride ceramic, a carbide ceramic and an oxide ceramic, and inorganic compound components bound to the inner surfaces formed by the skeleton particles directly bound with each other and including an inorganic compound formed by calcinating pore forming particles including an organic polymer and inorganic particles being one or more inorganic material of a nitride ceramic, a carbide ceramic, an oxide ceramic, a metal and a metal compound. The ceramic of the skeleton particles is different from the inorganic compound of the inorganic compound components.

26 Claims, 17 Drawing Sheets

U.S. PATENT DOCUMENTS

| | | |
|---|---|---|
| 6,447,564 B1 | 9/2002 | Ohno et al. |
| 6,565,630 B2 | 5/2003 | Ohno et al. |
| 6,669,751 B1 | 12/2003 | Ohno et al. |
| 6,770,116 B2 | 8/2004 | Kojima |
| 6,939,825 B1 | 9/2005 | Ohno et al. |
| 2004/0031264 A1 | 2/2004 | Kojima |
| 2004/0033175 A1 | 2/2004 | Ohno et al. |
| 2004/0033893 A1* | 2/2004 | Tomita et al. ............... 502/178 |
| 2004/0055265 A1 | 3/2004 | Ohno et al. |
| 2004/0091709 A1 | 5/2004 | Ohmura et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0076626 A1 | 4/2005 | Kudo et al. |
| 2005/0102987 A1 | 5/2005 | Kudo |
| 2005/0109023 A1 | 5/2005 | Kudo et al. |
| 2005/0115224 A1 | 6/2005 | Kojima |
| 2005/0153099 A1 | 7/2005 | Yamada |
| 2005/0158534 A1 | 7/2005 | Tabuchi et al. |
| 2005/0159310 A1 | 7/2005 | Ohno et al. |
| 2005/0160710 A1 | 7/2005 | Taoka et al. |
| 2005/0161849 A1 | 7/2005 | Ohno et al. |
| 2005/0169818 A1 | 8/2005 | Ohno et al. |
| 2005/0169819 A1 | 8/2005 | Shibata |
| 2005/0175514 A1 | 8/2005 | Ohno |
| 2005/0176581 A1 | 8/2005 | Ohno et al. |
| 2005/0178098 A1 | 8/2005 | Ono et al. |
| 2005/0180898 A1 | 8/2005 | Yamada |
| 2005/0214504 A1 | 9/2005 | Yoshida |
| 2005/0229565 A1 | 10/2005 | Yoshida |
| 2005/0235621 A1 | 10/2005 | Kunieda et al. |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0021310 A1 | 2/2006 | Ohno et al. |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0051556 A1 | 3/2006 | Ohno et al. |
| 2006/0059877 A1 | 3/2006 | Yoshida |
| 2006/0068159 A1 | 3/2006 | Komori et al. |
| 2006/0073970 A1 | 4/2006 | Yamada |
| 2006/0093784 A1 | 5/2006 | Komori et al. |
| 2006/0154021 A1 | 7/2006 | Ohno et al. |
| 2006/0159602 A1 | 7/2006 | Ohno et al. |
| 2006/0166820 A1 | 7/2006 | Ogyu et al. |
| 2006/0172113 A1 | 8/2006 | Kunieda |
| 2006/0188415 A1 | 8/2006 | Ohno et al. |
| 2006/0194018 A1 | 8/2006 | Ohno et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0228521 A1 | 10/2006 | Ohno et al. |
| 2006/0230732 A1 | 10/2006 | Kunieda |
| 2006/0254231 A1 | 11/2006 | Hayashi et al. |
| 2007/0068128 A1 | 3/2007 | Oshimi et al. |
| 2007/0169453 A1 | 7/2007 | Hayakawa |
| 2007/0178275 A1 | 8/2007 | Takahashi |
| 2007/0190289 A1 | 8/2007 | Fujita |
| 2007/0190350 A1 | 8/2007 | Ohno et al. |
| 2007/0196620 A1 | 8/2007 | Ohno et al. |
| 2007/0204580 A1 | 9/2007 | Kunieda |
| 2007/0212517 A1 | 9/2007 | Ohno et al. |
| 2008/0083202 A1 | 4/2008 | Kunieda et al. |

FOREIGN PATENT DOCUMENTS

| | | |
|---|---|---|
| EP | 1 375 454 A1 | 1/2004 |
| EP | 1 375 525 A2 | 1/2004 |
| EP | 1 398 081 A1 | 3/2004 |
| EP | 1 489 278 A1 | 12/2004 |
| JP | 1-167281 | 6/1989 |
| JP | 3-1090 | 1/1991 |
| JP | 6-56554 | 3/1994 |
| JP | 7-223879 | 8/1995 |
| JP | 8-301672 | 11/1996 |
| JP | 11-171663 | 6/1999 |
| JP | 2002-274947 | 9/2002 |
| JP | 2002-326881 | 11/2002 |
| JP | 2002-356383 | 12/2002 |
| JP | 2003/10617 | 1/2003 |
| JP | 2003-210922 | 7/2003 |
| JP | 2003-236384 | 8/2003 |
| JP | 2003-262118 | 9/2003 |
| JP | 2004-83371 | 3/2004 |
| WO | WO 02/072671 A2 | 9/2002 |
| WO | WO 02/081406 A1 | 10/2002 |
| WO | WO 02/096827 A1 | 12/2002 |
| WO | 03/082770 | 10/2003 |
| WO | 03/082771 | 10/2003 |
| WO | WO 2004024293 | 3/2004 |

OTHER PUBLICATIONS

U.S. Appl. No. 11/225,197.
U.S. Appl. No. 10/502,044, filed Jan. 24, 2005, Taoka et al.
U.S. Appl. No. 10/518,548, filed Jan. 3, 2005, Takahashi.
U.S. Appl. No. 11/174,483, filed Jul. 6, 2005, Saijo et al.
U.S. Appl. No. 11/476,929.
U.S. Appl. No. 11/496,431.
U.S. Appl. No. 11/513,149.
U.S. Appl. No. 11/518,998.
U.S. Appl. No. 11/600,775.
U.S. Appl. No. 11/600,784.
U.S. Appl. No. 11/626,158, filed Jan. 23, 2007, Ohno et al.
U.S. Appl. No. 11/874,790, Oshimi.
U.S. Appl. No. 11/851,300, Oshimi.
U.S. Appl. No. 11/925,459, Ito.
U.S. Appl. No. 11/932,469, Oshimi.
U.S. Appl. No. 11/927,225, Saito et al.

* cited by examiner

In the condition of degassing ated this page content document# HONEYCOMB STRUCTURE, POROUS BODY, PORE FORMING MATERIAL FOR THE POROUS BODY, AND METHODS FOR MANUFACTURING THE PORE FORMING MATERIAL, THE POROUS BODY AND THE HONEYCOMB STRUCTURE

CROSS-REFERENCE TO RELATED APPLICATIONS

This application is a divisional of U.S. patent application Ser. No. 11/033,151, filed on Jan. 12, 2005, which claims the benefit of priority under 35 U.S.C. §119 to Japanese Patent Application No. 2004-006152, filed Jan. 13, 2004. The entire contents of those applications are incorporated herein by reference.

BACKGROUND OF THE INVENTION

1. Field of the Invention

The present invention relates to a honeycomb structure, a porous body and a pore forming material for the porous body. The present invention further relates to methods for manufacturing the pore forming material, the porous body and the honeycomb structure.

2. Discussion of the Background

Unexamined Japanese Patent Publication (kokai) No. 2003-10617 discloses a method for manufacturing a porous body in which polymer particles (a pore forming material for a porous body) having a pore formation function are blended into a skeleton material comprised of a ceramic, a metal, etc. and the resultant mixture is subjected to molding, drying, degreasing, and calcination to obtain a porous body. In such a manufacturing method, the polymer particles are burnt and removed by decomposition in a degreasing step, and thereby pores are formed in the portion so far occupied by the polymer particles. The contents of Unexamined Japanese Patent Publication (kokai) No. 2003-10617 are incorporated herein by reference in their entirety.

SUMMARY OF THE INVENTION

According to one aspect of the present invention, a pore forming material for a porous body includes organic polymer particles and inorganic particles.

According to another aspect of the present invention, a method for manufacturing a pore forming material for a porous body includes polymerizing an organic monomer in an organic solvent to form organic polymer particles having void spaces inside the organic polymer particles. The organic polymer particles and inorganic particles are mixed. The mixture is degassed to inject the inorganic particles in the void spaces of the inside of the organic polymer particles.

According to yet another aspect of the present invention, a method for manufacturing a porous body includes mixing skeleton particles and a pore forming material containing an organic polymer particles and inorganic particles to make a mixture. The mixture is molded to produce a molded product. The molded product is heated.

According to yet another aspect of the present invention, a porous body includes skeleton particles and an inorganic compound. The skeleton particles include a first element and constitute an inner surface to form a void space. The inorganic compound contains a second element different from the first element. The second element exists at least on the inner surface.

According to yet another aspect of the present invention, a porous body includes skeleton particles and an inorganic compound. The skeleton particles include a first element and constitute an inner surface to form a void space. The inorganic compound contains the first element which is scattered on the inner surface.

According to yet another aspect of the present invention, a porous body includes skeleton particles and an inorganic compound. The skeleton particles include a first element and constitute an inner surface to form a void space. The void space has a major axis which is equal to or larger than a major axis of the skeleton particles. The inorganic compound contains a second element different from the first element. The second element exists at least on the inner surface.

According to yet another aspect of the present invention, a porous body includes skeleton particles and an inorganic compound. The skeleton particles include a first element and constitute an inner surface to form a void space. The void space has a major axis which is equal to or larger than a major axis of the skeleton particles. The inorganic compound contains the first element which is scattered on the inner surface.

According to yet another aspect of the present invention, a porous body is made by mixing skeleton particles and a pore forming material containing an organic polymer and inorganic particles.

According to yet another aspect of the present invention, a honeycomb structure includes skeleton particles and an inorganic compound. The skeleton particles include a first element and constitute an inner surface to form a void space. The inorganic compound contains a second element different from the first element. The second element exists at least on the inner surface.

According to yet another aspect of the present invention, a honeycomb structure includes skeleton particles and an inorganic compound. The skeleton particles include a first element and constitute an inner surface to form a void space. The inorganic compound contains the first element which is scattered on the inner surface.

According to yet another aspect of the present invention, a honeycomb structure includes skeleton particles and an inorganic compound. The skeleton particles include a first element and constitute an inner surface to form a void space. The void space has a major axis which is equal to or larger than a major axis of the skeleton particles. The inorganic compound contains a second element different from the first element. The second element exists at least on the inner surface.

According to yet another aspect of the present invention, a honeycomb structure includes skeleton particles and an inorganic compound. The skeleton particles include a first element and constitute an inner surface to form a void space. The void space has a major axis which is equal to or larger than a major axis of the skeleton particles. The inorganic compound contains the first element which is scattered on the inner surface.

According to yet another aspect of the present invention, a method for manufacturing a honeycomb structure includes mixing skeleton particles and a pore forming material containing an organic polymer particles and inorganic particles to make a mixture. The mixture is molded to produce a molded product. The molded product is heated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
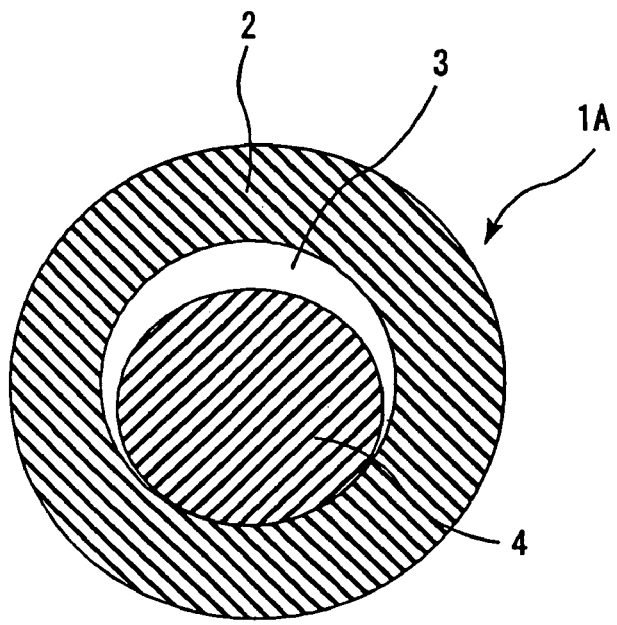
FIG. 1A and FIG. 1B are views showing a pore forming material for a porous body (with a hollow portion) according embodiments of the present invention.

The embodiments will now be described with reference to the accompanying drawings, wherein like reference numerals designate corresponding or identical elements throughout the various drawings.

Figure 1B:
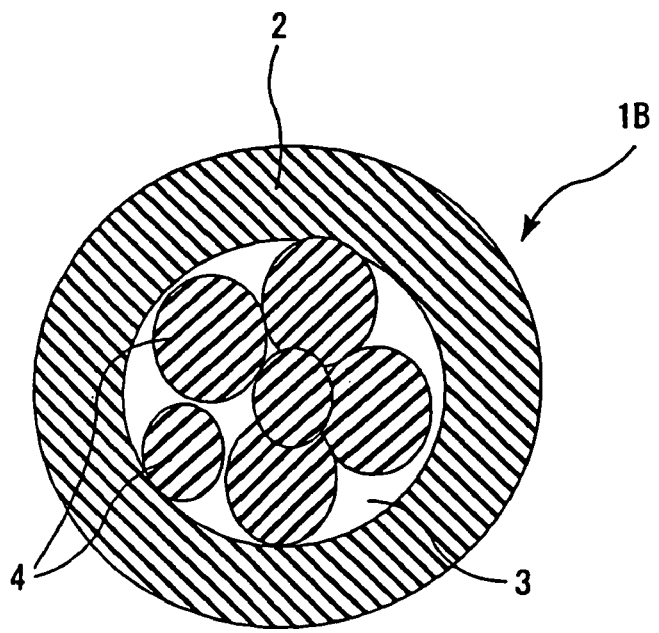

FIGS. 1A and 1B show pore forming materials 1A and 1B according to an embodiment of the present invention. Referring to FIG. 1A, the pore forming material 1A includes organic polymer particles 2. The organic polymer particle 2 has a hollow portion 3 in the organic polymer particle 2 and includes an inorganic particle 4 in the hollow portion 3. Referring to FIG. 1B, the pore forming material 1B includes organic polymer particles 2. The organic polymer particle 2 has a hollow portion 3 in the organic polymer particle 2 and includes a plurality of inorganic particles 4 in the hollow portion 3.

One inorganic particle may be contained in one organic polymer particle 2 as shown in FIG. 1A, or a plurality of inorganic particles may be contained in one organic polymer particle 2 as shown in FIG. 1B.

It is inferred that when a pore material has such a structure, even in a case where the pore forming material for a porous body is formulated with a high content of organic polymer particles with the aim of manufacturing a porous body with a high porosity, since the total amount of organic components is low, local heat shock caused by rapid decomposition and combustion of organic components is unlikely to occur at the time of heating. Thus, cracking in a molded body is considered unlikely to occur.

Furthermore, having a structure of containing inorganic particles in the hollow organic polymer, the inorganic particles function as a reinforcing material for the pore forming material for a porous body, imparting excellent mechanical strength to the pore forming material for a porous body. Accordingly, even in the case where a pressure has to be applied in extrusion molding or press molding, etc., to form a shape, no distortion of the pore forming material for a porous body occurs. In this way, since the pore forming material for a porous body having greater strength can be added in a great amount, this specific embodiment is particularly suitable for the manufacture of a porous body with a high porosity of 50% or more.

Figure 2A:
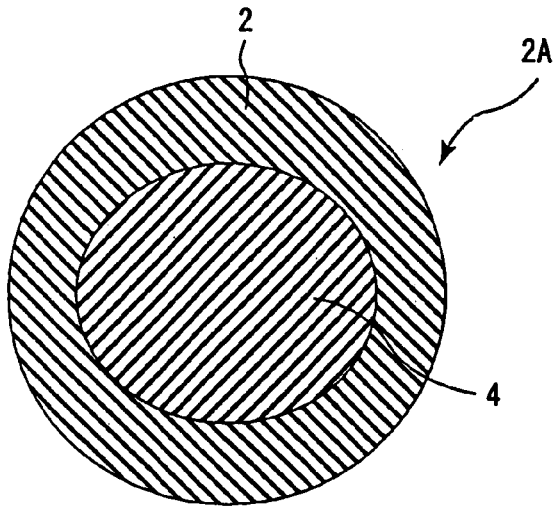
FIG. 2A and FIG. 2B are views showing a pore forming material for a porous body (with no hollow portion) according to embodiments of the present invention.
Figure 2B:
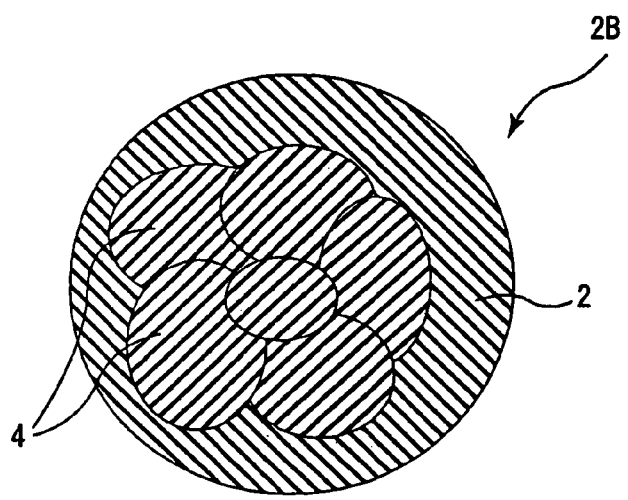

FIGS. 2A and 2B show embodiments wherein there is no hollow inside of organic polymer particles 2, and organic polymer particles 2 and inorganic particles 4 are closely contacted. Inorganic particles here also function for the prevention of local heat shock caused by rapid decomposition and combustion of organic components and as a reinforcing material for the pore forming material for a porous body. Thus, the improved effects of the mechanical strength of the pore forming material for a porous body can also be observed in these embodiments.

Figure 2C:
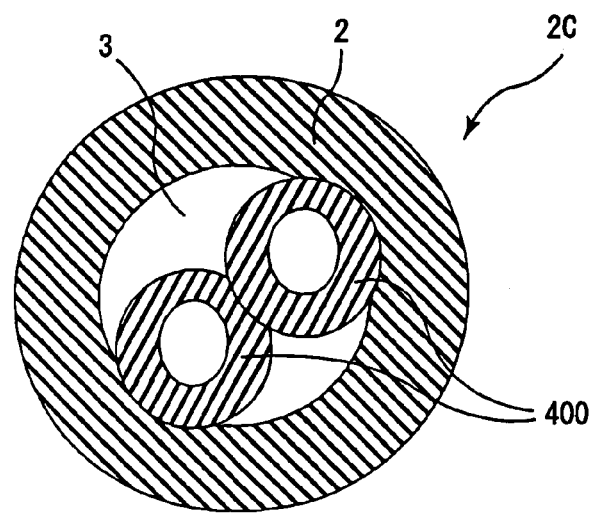
FIG. 2C is a view showing a pore forming material for a porous body (with inorganic particles in a balloon shape) according to an embodiment of the present invention.

In addition, FIG. 2C discloses a specific embodiment wherein a hollow portion 3 is provided inside an organic polymer particle 2, and a microballoon 400 is used as the inorganic particles. Examples of the above-mentioned microballoon include alumina balloon, glass microballoon, silas balloon, fly ash balloon (FA balloon), and mullite balloon. Among them, alumina balloon is preferable. Note that the above-mentioned balloon refers to a concept including a bubble and a hollow ball, and indicate a hollow particle having a pore inside.

Since the inner volume of the inner space of Microballoon 400 can be increased or decreased, it is possible to control total amount of inorganic component.

Furthermore, when inorganic particles contained in pore forming materials 1A, 1B, 2A, 2B, and 2C have a function as a sintering additive, those pore materials will have not only a pore-formation function, but also a function as a sintering additive, thus making it possible to lower calcination temperature, or to produce a porous body excellent in mechanical properties by promoting sintering.

Figure 17A:
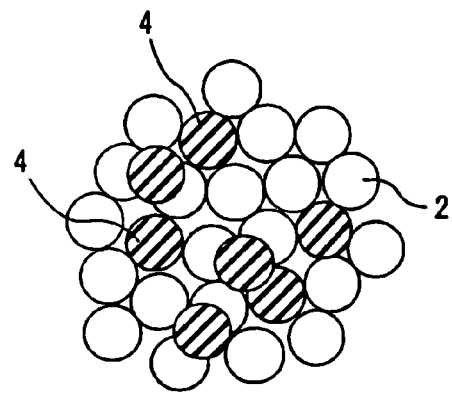
FIGS. 17A-17C are views showing a pore forming material for a porous body according to embodiments of the present invention.
Figure 17B:
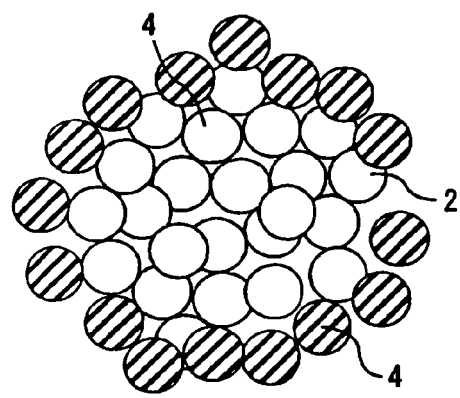
Figure 17C:
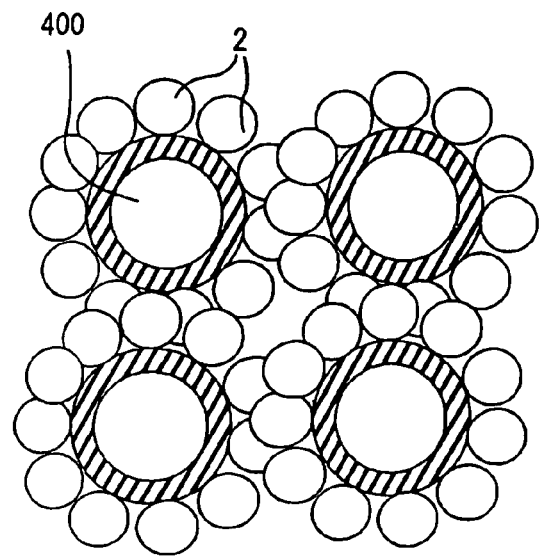

FIGS. 17A-17C show pore materials according to an embodiment of the present invention. Referring to FIGS. 17A-17C, the pore material includes organic polymer particles 2 and inorganic particles 4. Referring to FIG. 17A, the organic polymer particles 2 and the inorganic particles 4 are mixed together. In FIG. 17A, the inorganic particles 4 exist among three-dimensional network structures of the polymer particles 2. Referring to FIG. 17B, the inorganic particles 4 substantially surround the organic polymer particles 2. Some inorganic particles 4 are mixed with the organic polymer particles 2 inside the surrounding inorganic particles 4. Referring to FIG. 17C, the microballoon 400 is surrounded by the organic polymer particles 2.

Examples of the organic polymer particles 2 include a polymer of monomer mixture compositions including a hydrophilic monomer, a multi-functional monomer, and other monomers.

Examples of the above-mentioned hydrophilic monomer include methyl (meth)acrylate, (meth)acrylonitrile, (meth) acrylamide, (meth)acrylic acid, glycidyl (meth)acrylate, 2-hydroxyethyl methacrylate, 2-hydroxypropyl methacrylate, vinylpyridine, 2-acryloyloxyethyl phthalate, itaconic acid, fumaric acid, and dimethylaminomethyl methacrylate, preferably methyl methacrylate, (meth)acrylic acid, and 2-hydroxyethyl methacrylate. These may be used alone or as a combination of two or more.

Examples of the above-mentioned polyfunctional monomer include di(meth)acrylate, and tri(meth)acrylate.

As examples of the above-mentioned di(meth)acrylate, ethylene glycol di(meth)acrylate, diethylene glycol di(meth) acrylate, triethylene glycol di(meth)acrylate, 1,6-hexanediol di(meth)acrylate, and trimethylolpropane di(meth)acrylate can be mentioned.

As examples of the above-mentioned tri(meth)acrylate, trimethylolpropane tri(meth)acrylate, ethylene oxide-modified trimethylolpropane tri(meth)acrylate, and pentaerythritol tri(meth)acrylate can be mentioned.

Further, as examples of the above-mentioned polyfunctional monomer, pentaerythritol tetra(meth)acrylate, dipentaerythritol hexa(meth)acrylate; a di- or triallyl compound such as diallyl phthalate, diallyl malate, diallyl fumarate, diallyl succinate, and triallyl isocyanurate; a divinyl compound such as divinylbenzene, and butadiene can be mentioned. These may be used alone or as a combination of two ore more.

Examples of the above-mentioned other monomers include alkyl(meth)acrylate such as ethyl(meth)acrylate, propyl(meth)acrylate, butyl(meth)acrylate, cumyl methacrylate, cyclohexyl(meth)acylate, mistyryl(meth)acrylate, palmityl (meth)acrylate, and stearyl(meth)acrylate; an aromatic vinyl monomer such as styrene, α-methylstyrene, p-methylstyrene, and p-chrorostyrene; vinyl ester such as vinyl acetate and vinyl propionate; a halogen-containing monomer such as vinyl chloride and vinylidene chloride; and ethylene, propylene, and butadiene can be mentioned. These may be used alone, or as a combination of two or more.

Examples of the above-mentioned inorganic particles include particles comprising ceramics such as nitride ceramics including aluminum nitride, silicon nitride, boron nitride, and titanium nitride; carbide ceramics such as silicon carbide, zirconium carbide, titanium carbide, tantalum carbide, boron carbide, and tungsten carbide; oxide ceramics such as alumina, zirconia, cordierite, mullite, and silica; and particles comprising a metal such as Si, Fe, and Al, or a metal compound such as oxide of iron. Among these, particles including ceramics are preferable, and particularly preferable are particles including oxide ceramics in order to prevent explosion during handling the inorganic particles.

The porosity of the above-mentioned pore forming materials for a porous body 1A, 1B, and 2C, the desirable lower limit is about 10% by volume and the desirable upper limit is about 70% by volume. Thermal shock can be reduced while maintaining the mechanical strength of the pore forming materials for a porous body 1A and 1B.

The more preferable lower limit of the above-mentioned porosity is about 20% by volume and the more preferable upper limit is about 60% by volume.

The porosities of the pore forming materials for a porous body 1A, 1B and 2C are obtained by determining the components of the organic polymer and those of inorganic particles for a pore material using, for example, gas chromatography, fluorescent X-ray analysis, or the like and then calculating the respective densities using a specific gravity bottle. The organic element is then eliminated by combustion and the volume of the organic polymer is calculated assuming that the reduced weight is the amount of the organic element, while the volume of the inorganic particles is calculated assuming that the weight of the remained portion is that of the inorganic particles. The porosity is obtained using the two volume values.

Further, in the pore forming materials for a porous body 1A, 1B, 2A, 2B, and 2C, the desirable lower limit of the volume ratio of the organic polymer particles 2 based on the inorganic particles 4 (the organic polymer/the inorganic particles) is about 0.1 and the desirable upper limit thereof is about 250, and preferably upper limit thereof is about 10. This is because thermal shock can be reduced in this range without lowering the pore forming performance. The more preferable lower limit of the above-mentioned volume ratio is about 0.2 and the more preferable upper limit is about 5.

In addition, the particle sizes of the pore forming materials for a porous body 1A, 1B, 2A, 2B, and 2C are not particularly limited, and they may be suitably selected considering the pore size of the porous body to be produced. Usually, a particle size of about 20 to 60 μm is desirable. Further, the particle size is desirably about 0.5 to about 10.0 times of that of the skeleton particles, and preferably about 0.5 to about 5.0 times of that of the skeleton particles. This is because the pore forming effects for the porous body can be obtained and the strength can be enhanced.

Figure 3:
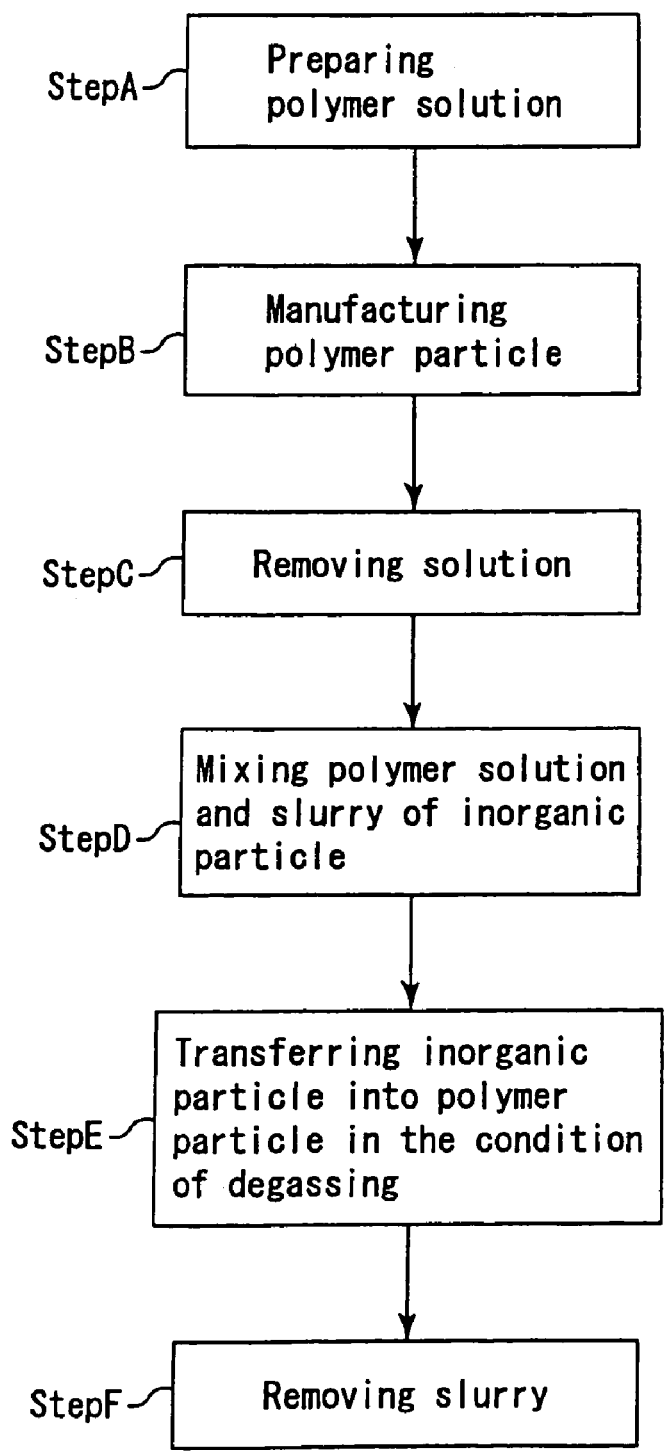
FIG. 3 is a flow chart for manufacturing a pore forming material for a porous body according to an embodiment of the present invention.

Next, the method for manufacturing the pore forming materials 1A, 1B, 2A, 2B, and 2C for a porous body will be explained. FIG. 3 shows the flow chart of the steps.

Referring to FIG. 3, first, a solution to polymerize a polymer is prepared as shown in step A. The polymer is then polymerized as shown in step B. Hollow particles are produced by removing the solvent as shown in step C. Then, the polymer particles are mixed into slurry containing inorganic particles as shown in step. The inorganic particles are injected and transferred into the polymer particles while degassing them as shown in step E. Then, the slurry is removed as shown in step F to finally obtain a pore material.

Figure 4A:
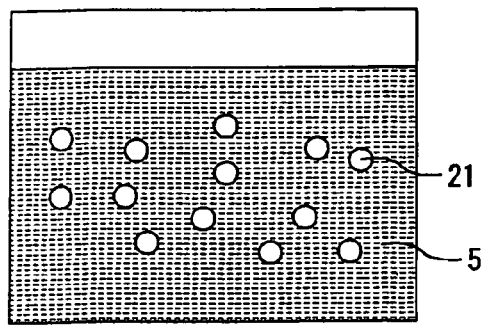
FIGS. 4A to 4F are schematic diagrams of the steps for manufacturing a pore forming material for a porous body according to an embodiment of the present invention.
Figure 4B:
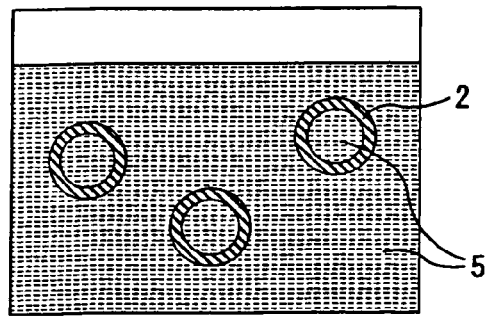
Figure 4C:
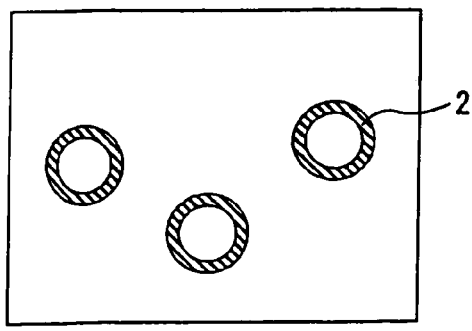

Specifically, for example, as shown in FIG. 4A, a non-polymeric organic solvent is mixed to the above-mentioned mixed monomers 21 including a hydrophilic monomer, a multi-functional monomer, and other monomers to prepare a monomer solution. After suspending the monomer solution to an organic solvent 5, the monomer components are polymerized as shown in FIG. 4B to obtain organic polymer particles 2 containing the non-polymeric organic solvent. Then, as shown in FIG. 4C, the organic solvent 5 in the polymer particles 2 is removed to obtain hollow organic polymer particles 2.

Here, the method for polymerizing the mixed monomers is not particularly limited, it is desirable to use a suspension polymerization method due to the advantages that the particle size can be easily controlled and that particles each having an effective void space can be easily produced.

Figure 4D:
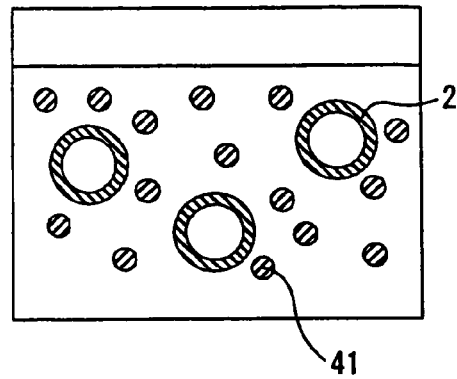
Figure 4E:
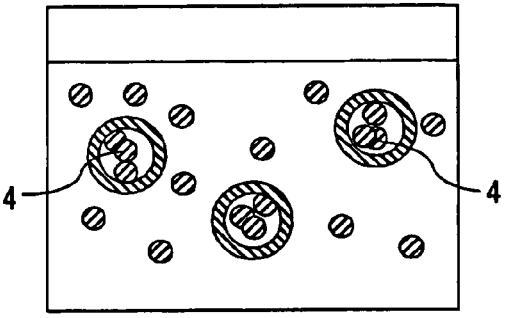
Figure 4F:
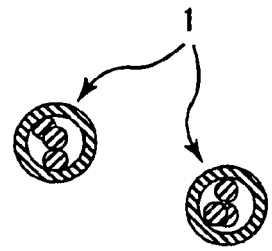

Further, as shown in FIG. 4D, the obtained hollow polymer particles 2 are mixed to the slurry 41 containing inorganic particles of a predetermined concentration. The inorganic particles 4 are then injected and transferred into hollow polymer particles 2. Then, the slurry is removed and drying is performed to obtain the pore forming materials for a porous body 1A, 1B, 2A, 2B, and 2C.

Here, instead of the slurry 41, a sol containing inorganic particles such as alumina sol or silica sol may be used. Adjusting the content of inorganic particles to a high ratio can be achieved by repeating several times the steps of mixing hollow polymer particles 2 to the slurry 41, immersing and drying. In addition, a pore forming material for a porous body can be produced by mixing inorganic particles such as alumina and silica into the above-mentioned mixed monomers beforehand, and then polymerizing the mixed monomers using a publicly known technique of capsulation.

Moreover, a pulverization treatment may be performed to granulate each of the inorganic particles 4. Further, by subjecting the inorganic particles 4 to a chemical treatment (for example, acid treatment) or a physical treatment (for example, grinding treatment), the weight of each inorganic particle can be reduced so as to adjust the ratio of the organic component and the inorganic component. Therefore it is possible to change strength of pore forming material.

Figure 5:
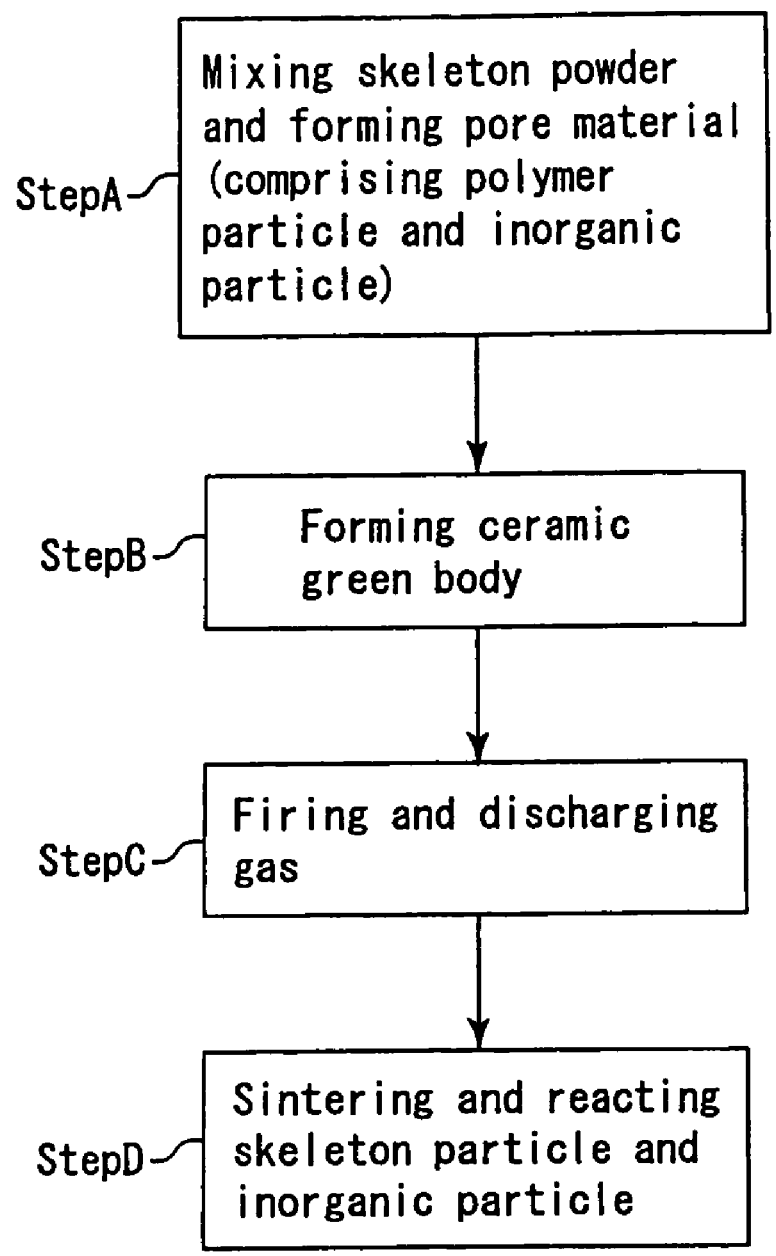
FIG. 5 is a flow chart for manufacturing a porous body according to an embodiment of the present invention.

Now, a specific embodiment of the manufacturing method of a porous body will be explained using the flow in FIG. 5.

First, in step G, skeleton particles and a pore forming material (including organic polymer particles and inorganic particles) are mixed. Then, in step H, a molded form is produced. In step I, the molded form is heated so that the organic particles are thermally decomposed and gasified to be removed. In step J, heating is continued to promote the sintering reaction among the skeleton particles.

In this specific embodiment, it is possible to lower the heating temperature while maintaining the breaking strength of the porous body. It is inferred that the organic polymer particles 2 constituting the pore forming material 1 are thermally decomposed and gasified and the gas is released to create a void space, while the sintering reaction among the skeleton particles are promoted by the inorganic component having a function as a sintering additive to promote calcination at a lower temperature. These are considered to be the reasons why the resultant porous body has a mechanical strength even with a high porosity and why calcination at a lower temperature is made possible.

In the manufacturing method according to the embodiments of the present invention, it is desirable to use, for example, silicon carbide particles as the skeleton particles and to use a pore forming material for a porous body containing alumina as the pore forming material for a porous body. In this case, in the subsequent calcination step, alumina contained in the pore forming material for a porous body functions as a sintering additive to lower the calcination temperature, or to promote calcination to produce a porous body excellent in mechanical strength.

Figure 6A:
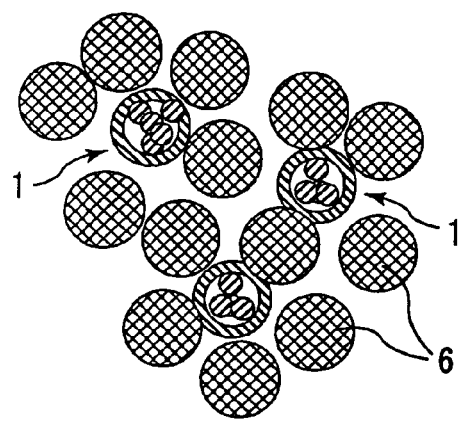
FIGS. 6A to 6D are schematic diagrams of the steps for manufacturing a porous body according to an embodiment of the present invention.

Specifically, as shown in FIG. 6A, the above-mentioned pore forming material for a porous body 1 (including, comprehensively, 1A, 1B, 2A, 2B, and 2C) and skeleton material 6 are mixed.

Examples of the skeleton particles 6 include, nitride ceramics such as aluminum nitride, silicon nitride, boron nitride, and titanium nitride; carbide ceramics such as silicon carbide, zirconium carbide, titanium carbide, tantalum carbide, tungsten carbide; and oxide ceramics such as alumina, zirconia, cordierite, mullite, and silica.

Although the particle size of the skeleton particles is not particularly limited, those resulting in less contraction in the subsequent heating step is preferable, and, for example, a combination of 100 parts by weight of a powder having an average particle size of about 5.0 to 50 μm and 5 to 65 parts by weight of a powder having about 0.1 to 3.0 μm is preferable.

Specifically, to the above-mentioned pore forming material for a porous body 1 is added, if necessary, a binder, a dispersion medium, etc., and the resultant mixture is mixed with an attritor, etc., and then is kneaded well with a kneader, etc. The above-mentioned binder is not particularly limited, and examples include methyl cellulose, carboxymethyl cellulose, hydroxyethyl cellulose, polyethylene glycol, a phenol resin, and an epoxy resin. The above-mentioned dispersion medium is not particularly limited, and examples include an organic solvent such as benzene, alcohol such as methanol, and water.

Here, the content of the above pore forming material for a porous body 1 is not particularly limited, and it may be suitably selected according to the porosity, etc. of the porous body 10 to be produced. Usually, about 100 to 200 parts by weight based on 100 parts by weight of the skeleton particles is preferable. Particularly, it is desirable to blend the material so as to have about 5 to 50 parts by weight of the organic polymer component based on 100 parts by weight of the skeleton particles 100. Further, the content of the binder is desirably about 1 to 10 parts by weight based on 100 parts by weight of ceramic powder. The dispersion medium may be suitably blended so that the viscosity of the mixture becomes within a given range.

When mixing the pore forming material for a porous body 1 and the skeleton material 6, a formation auxiliary may be added, if necessary.

As a formation auxiliary, there is no particular limitation, and for example, ethylene glycol, dextrin, fatty acid soap, and polyalcohol may be used.

Further, in the step above, a pore forming material consisting only of the above-mentioned inorganic balloons, or organic polymers may be added, if necessary.

Figure 6B:
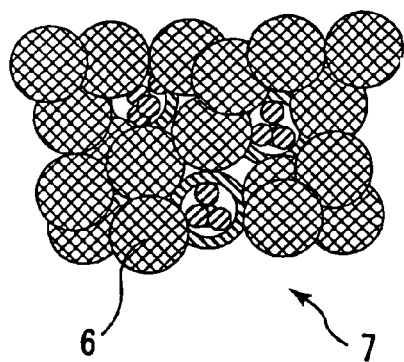
Figure 6C:
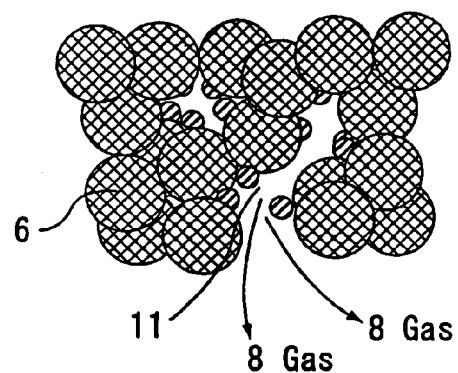

Next, as shown in FIG. 6B, a molded body 7 including the pore forming material for a porous body 1 and the skeleton particles 6 is produced by molding the mixture. Molding of the mixture can be performed by extrusion molding, etc. Further, as shown in FIG. 6C, by subjecting the molded mixture to heating, the organic polymer particles are thermally decomposed and gasified as gas 8. Void space 11 can be formed by eliminating the gas.

Heating treatment may be performed by dividing, for example, into the drying step, the degreasing step, and the calcining step. The drying step of the molded body can be performed by using, for example, a microwave dryer, a hot air dryer, a conductive dryer, a decompression dryer, a vacuum dryer, and a freeze dryer. As for the conditions for the degreasing step and the calcining step, the conditions used for producing conventional porous bodies can be applied.

Figure 6D:
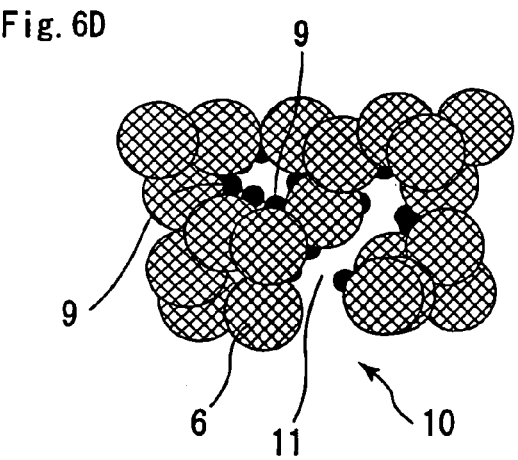

Specifically, the degreasing step may be performed with the condition of heating at about 300 to 650° C. under the atmosphere containing oxygen. The calcining step may be performed with the condition of, for example, heating at about 1000 to 2300° C. under the inert gas atmosphere such as nitrogen and argon. In the case where those functioning as a sintering additive are contained in the inorganic particles contained in the pore forming material for a porous body, as shown in FIG. 6D, an inorganic particle or a product 9 (inorganic compound) which is produced as a result of the reaction between the inorganic particles and the skeleton particles is present on the inner wall surface of the void space 11.

Since the sintering proceeds by the reaction between the inorganic particles and the skeleton particles, the sintering temperature can be lowered compared with the case where the skeleton particles alone are sintered. Further, it is possible to produce a porous body 10 with excellent mechanical properties by proceeding the sintering. For example, when a carbon nitride powder is used as the skeleton material and the inorganic particles are alumina, the sintering temperature (usually about 2200° C.) can be lowered by about 100 to 300° C. Further, the total amount of heat released from the molded body by combustion of the organic component can be reduced, and hence the generation of thermal stress due to the rapid heat generation of the molded body can be prevented.

Next, specific embodiments of the porous body will be sequentially explained.

Figure 7A:
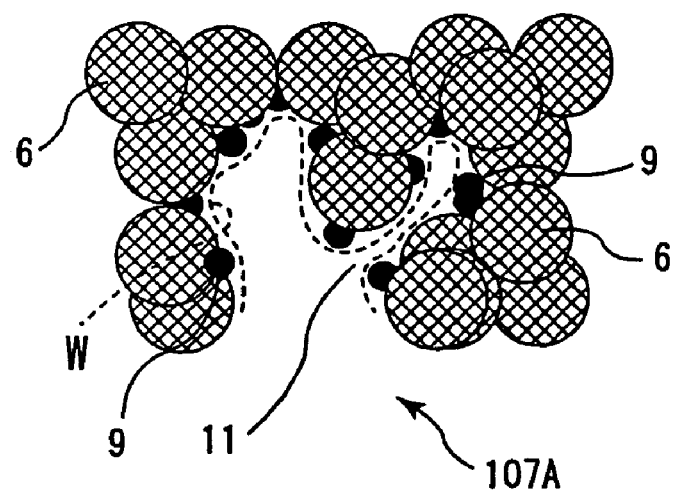
FIGS. 7A and 7B are schematic diagrams of a porous body according to an embodiment of the present invention.

Specific embodiments of the porous body are shown in FIG. 7A. In FIG. 7A, at least on the surface (inner wall "W") of the void spaces 11 of the skeleton particles 6, an inorganic compound 9 containing an element different from those of the skeleton particles 6 is present. Since the inorganic compound 9 containing an element different from those of the skeleton particles 6 firmly fixes the skeleton particles, even if the void spaces 11 grow larger (namely, the inner wall W between the void spaces 11 becomes thinner), the breaking strength of the porous body 107A can be maintained to a high degree.

Figure 7B:
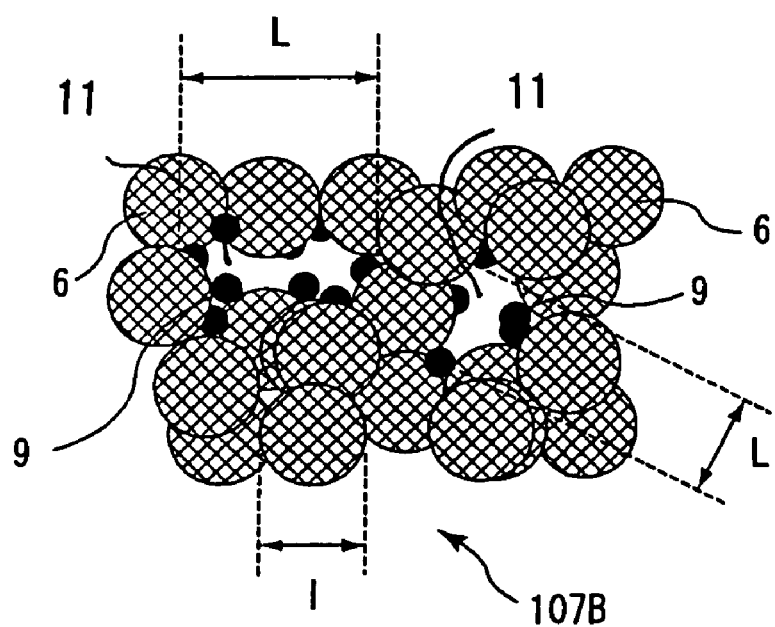

Another specific embodiment, or porous body 107B is shown in FIG. 7B. The porous body 107B includes the skeleton particles 6 and a void space 11 formed by being encircled by the skeleton particles 6, wherein the major axis L of the void space is greater than the major axis of the skeleton particles 6, in which an inorganic compound 9 having an element different from those of the skeleton particles 6 is present at least on the surface of the skeleton particles exposing to the void spaces 11.

That is, in this porous body 107B, void spaces 11 (pores) larger than the void spaces which are supposed to be formed by the skeleton particles 6 are formed. Thus, when the porous body is used for filtering purpose, the deposit capacity of the filtered substance can be made greater. As a result, it is possible to extend the filter life. Further, the pressure loss can be reduced when fluid such as gas or liquid flows through the filter.

Even if such large void spaces 11 are present (namely, the inner walls W of the void spaces 11 are thinner), since the inorganic compound 9 containing an element different from those of the skeleton particles firmly bind the skeleton particles, the breaking strength of the porous body 107B can be maintained to a high degree.

Figure 8A:
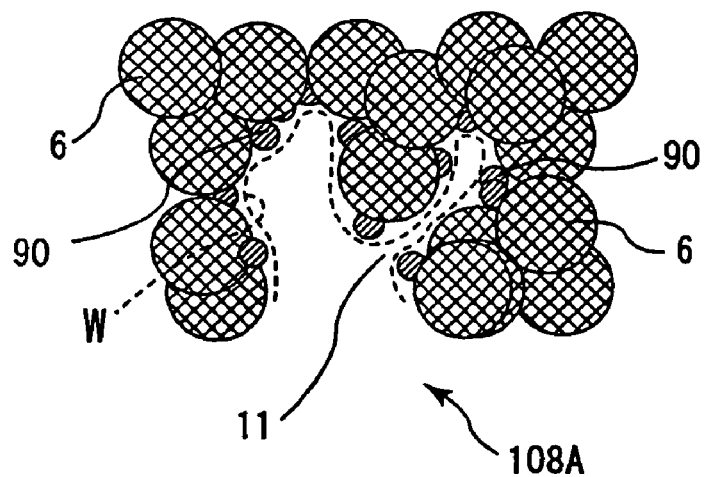
FIGS. 8A and 8B are schematic diagrams of a porous body according to an embodiment of the present invention.

Further, still another specific embodiment, the porous body 108A is shown in FIG. 8A. In FIG. 8A, a plurality of elements 90 which are the same as one of the elements constituting the skeleton particles 6 are locally present at least on the surface (the inner wall W) of the skeleton particles 6 exposed to the void space 11. Elements 90 which are the same as one of the elements constituting the skeleton particles 6 are locally present includes a state, for example, where Si is locally present when silicon carbide, or the combination of silicon carbide and silicon are employed as the skeleton particles 6.

Since the locally present elements 90 which are the same as one of the elements constituting the skeleton particles 6 firmly bind the skeleton particles 6, even if the void spaces 11 become larger (namely, the inner wall W of the void spaces 11 becomes thinner), the breaking strength of the porous body 108A can be maintained to a high degree.

Figure 8B:
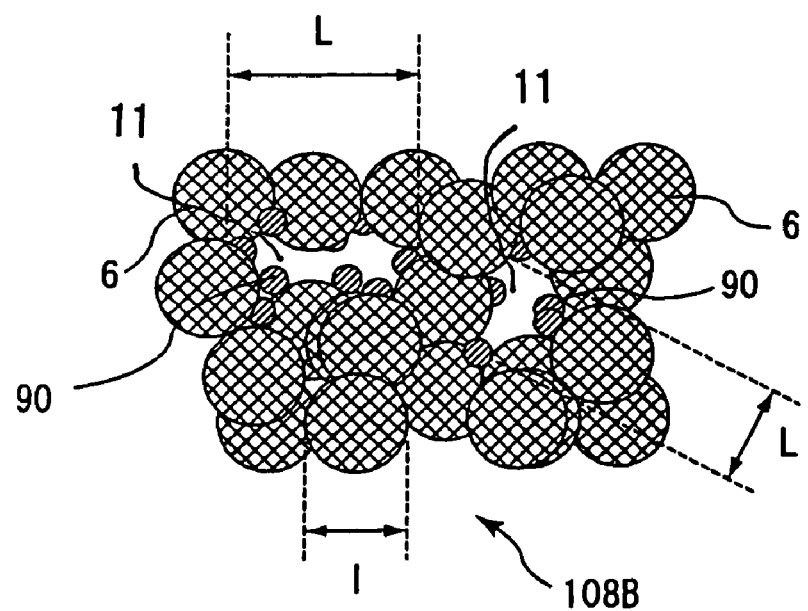

Still another specific embodiment, the porous body 108B is shown in FIG. 8B. The porous body 108B includes skeleton particles 6 and a void space 11 formed by being encircled by the skeleton particles 6, wherein the major axis L of the void space is greater than the major axis of the skeleton particles 6, in which elements 90 which are the same as one of the elements of the skeleton particles 6 are locally present at least on the surface of the skeleton particles exposed to the void spaces 11.

In other words, void spaces 11 (pores) larger than those supposed to be formed by the skeleton particles 6 are formed in this porous body 108B. Thus, when this porous body is used for filtering purpose, the deposit capacity of the filtered substance can be made greater. As a result, it is possible to extend the filter life. Further, the pressure loss can be reduced when fluid such as gas or liquid flows through the filter.

Figure 9A:
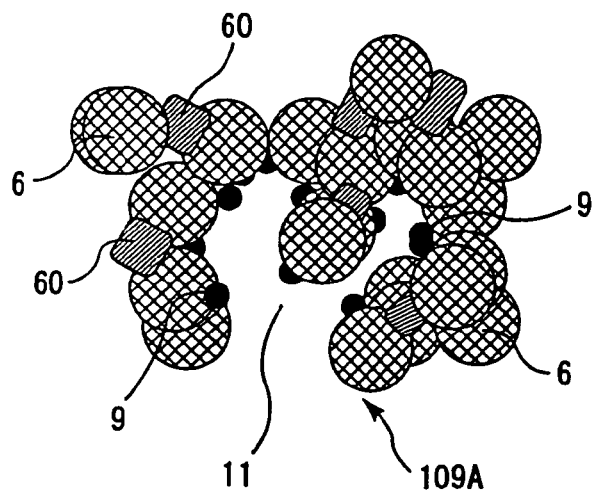
FIGS. 9A to 9C are schematic diagrams of a porous body according to embodiments of the present invention.

Still another specific example, the porous body 109A is shown in FIG. 9A. At least on the surface (the inner wall W) of the skeleton particles exposed to the void spaces 11, an inorganic compound 9 containing an element different from those of the skeleton particles 6 are present. The inorganic particles are further bound by another binding substance 60, and further, since the inorganic compound 9 containing an element different from those of the skeleton particles 6 firmly bind the skeleton particles, even if the void spaces 11 become larger (namely, the inner wall W between the void spaces 11 becomes thinner), the breaking strength and the tenacity value of the porous body 109A can be maintained to a high degree, and thus its thermal shock resistance can be improved.

As for the binding substance 60, a metal or a semi-conductor is desirable. As a metal, aluminum and iron are preferable, and as a semiconductor, silicone is preferable.

Figure 9B:
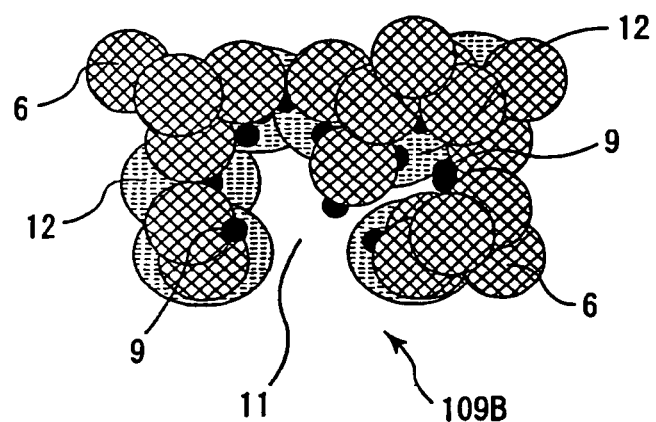

Another specific embodiment, the porous body 109B is shown in FIG. 9B. At least on the surface (inner wall W) of the void spaces 11 of the skeleton particles 6, an inorganic compound 9 containing an element different from those of the skeleton particles 6 is present. A catalyst 12 is coated on the inner wall of the void spaces 11.

Since the catalyst 12 is chemically bound to the inorganic compound 9, neither releasing nor falling of the catalyst will take place. Further, since the catalyst can be coated on the inner wall of the void spaces 11, the amount of the supported catalyst can be increased.

Figure 9C:
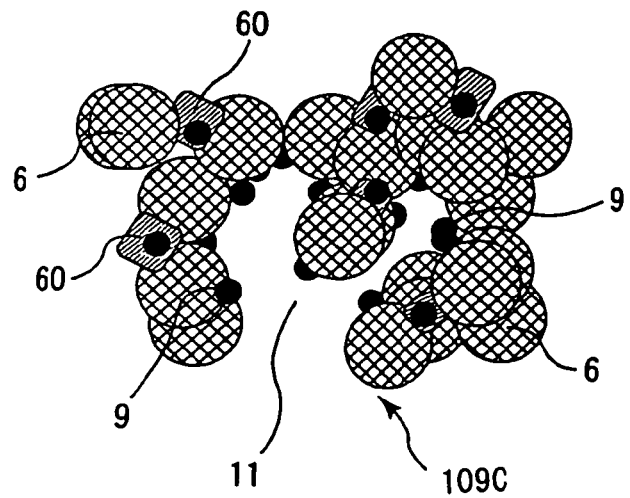

Still another specific example, the porous body 109C is shown in FIG. 9C. At least on the surface (the inner wall W) of the skeleton particles exposed to the void spaces 11, an inorganic compound 9 containing an element different from those of the skeleton particles 6 are present. The skeleton particles 6 are further bound by another binding substance 60 and inorganic compound 9, even if the void spaces 11 become larger (namely, the inner wall W between the void spaces 11 becomes thinner), the breaking strength and the tenacity value of the porous body 109C can be maintained to a high degree, and thus its thermal shock resistance can be improved. In this embodiment, binding material 60 is containing inorganic compound 9.

As for the binding substance 60, a metal or a semi-conductor is desirable. As a metal, aluminum and iron are preferable, and as a semiconductor, silicone is preferable.

The porosities of these specific embodiments of the porous body 107A, 107B, 108A, 108B, 109A, and 109B are about 45 to 85%, preferably about 50% to 85%.

In the case where the porosities are about 45 to 85%, performance of maintaining its shape is insured, no decline in the strength may occur and when the porous body is used as a filter, the increase in the pressure loss caused by the deposit of the filtered substance can be suppressed, and the life as a filter can be extended.

The porosities can be measured by, for example, a conventionally known method such as the mercury press-in method, the Archimedes method, and scanning electron microscope (SEM).

Additionally, in the specific embodiments of the porous bodies 107B and 108B, the major axes L of the void spaces are desirably 100 to 150% of the major axes I of the skeleton particles. The void spaces 11 constituting the porous body do not necessarily consist only of large ones whose major axes L are same as or larger than the major axis 1 of the skeleton particles, but may include those whose major axes L are smaller than the major axis 1 or the skeleton particles. Even if these small void spaces are mixed, the object of increasing the deposit capacity of the filtered substance can be achieved. Further, the pressure loss can be reduced when fluid such as gas or liquid flows through the filter.

The major axes I of the skeleton particles and the major axes L of the void spaces can be obtained, for example, by observing any 10 points of the porous body using a SEM of about 350 magnification and calculating the average.

The average pore size of the porous bodies 107A, 107B, 108A, 108B, 109A, and 109B is desirably about 5 to 100 μm. When the average pore size is about 5 to 100 μm, when the porous body of the present invention is used as a filter, it is possible to increase the deposit capacity of the substance to be filtered without lowering the filtering function.

In these specific embodiments of the porous bodies 107A, 107B, 108A, 108B, 109A, and 109B, examples of the skeleton particles 6 include ceramics such as nitride ceramics including aluminum nitride, silicon nitride, boron nitride, and titanium nitride; carbide ceramics such as silicon carbide, zirconium carbide, titanium carbide, tantalum carbide, boron carbide and tungsten carbide; and oxide ceramics such as alumina, zirconia, cordierite, mullite, and silica.

Examples of the inorganic particles 6 include ceramics such as nitride ceramics including aluminum nitride, silicon nitride, boron nitride, and titanium nitride; carbide ceramics such as silicon carbide, zirconium carbide, titanium carbide, tantalum carbide, and tungsten carbide; and oxide ceramics such as alumina, zirconia, cordierite, mullite, and silica, and a metal such as Si, Fe, and Al and a metal compound such as oxide of iron.

When the skeleton particles 6 comprises carbon nitride particles, or the combination of carbon nitride and a binding substance, it is preferable that the inorganic compound 9 is oxide ceramics, for example, at least one selected from alumina, mullite, silica, titania, and silica-alumina, since catalyst 12 is considered to be easily supported as shown in FIG. 9B. It is inferred that when a catalyst is added to a porous body, a functional group having a polar OH group, etc is added on the surface layer of the oxide ceramics, an oxide catalyst (perovskite type), a catalyst support (coating layer with a high specific surface area such as alumina, titania, and zirconia), or a catalyst can be easily supported, and that the catalyst once supported is unlikely to be detached.

When the inorganic compound 9 is an oxide ceramics, it is considered that corrosion of the porous bodies 107A, 107B, 108A, 108B, 109A, and 109B can be prevented. It is also inferred that when the inorganic compound 9 is a metal compound, for example, when the porous body is used as a filter for cleaning the exhaust gas, the oxide ceramics preferentially react with sulfur, alkali metal, alkaline earth metal, etc. contained in the exhaust gas, competitively preventing the reaction between sulfur, etc. in the exhaust gas and the skeleton particles constituting the porous body, and thus the corrosion of the porous body can be prevented.

Figure 10:
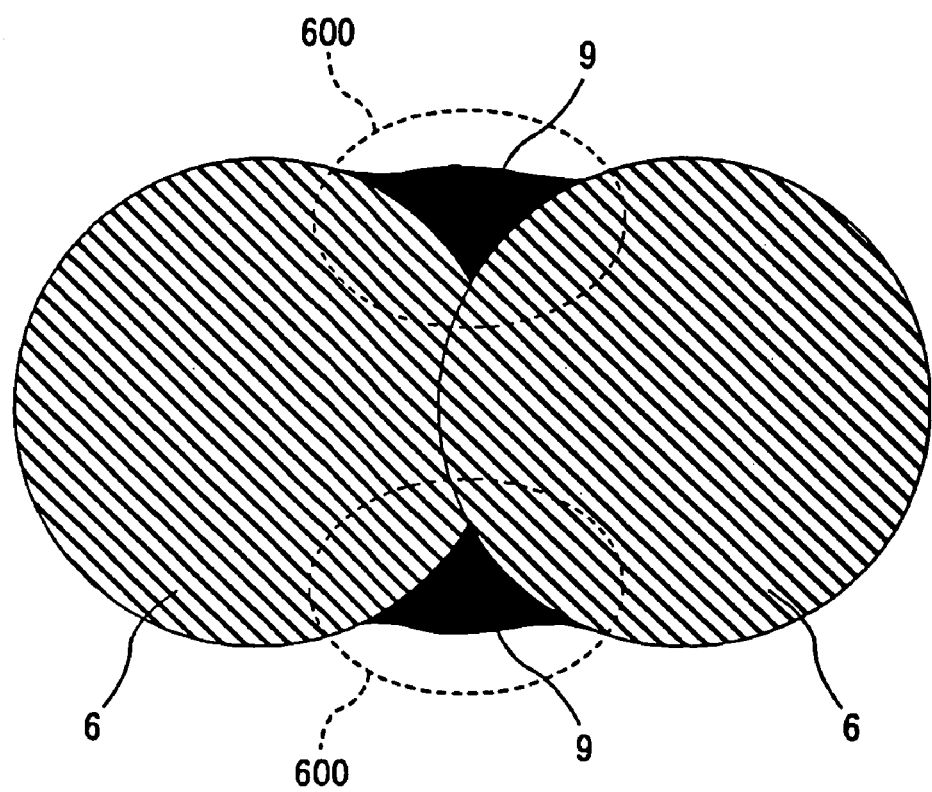
FIG. 10 is an enlarged view of a neck portion of a porous body according to and embodiment of the present invention.

In the porous bodies 107A, 107B, 108A, 108B, 109A, and 109B, it is desirable that the inorganic compound 9 is present at the neck portion 600 of the skeleton particles 6 as shown in FIG. 10. When the inorganic compound 9 is present at the neck portion 600, the joining force among the skeleton particles 6 are increased by thickening the binding portion (neck portion), improving the strength of the porous bodies.

It is desirable that the inorganic compound 9 is a crystalline compound crystallized from a liquid phase. By going through the liquid phase, a melt is once gathered on the neck portion due to the surface tension, and re-crystallization proceeds thereafter, and thus the inorganic compound 9 can be easily formed on the neck portion.

The neck portion 600 of the skeleton particles 6 indicates a part of the skeleton particle surface exposed to the void spaces, and an area in the vicinity of the outer circumference of the interface where the skeleton particles contact with each other.

When silicon carbide or a combination of silicon carbide and metal silicon is used as a skeleton material 6, and alumina or aluminum is used as the inorganic particles 4 of the pore forming material, alumina crystallizes from the liquid phase on the neck portions of the silicon carbide, or the neck portions of a complex of silicon carbide and a metal silicon (Examples 1 to 5).

Figure 11:
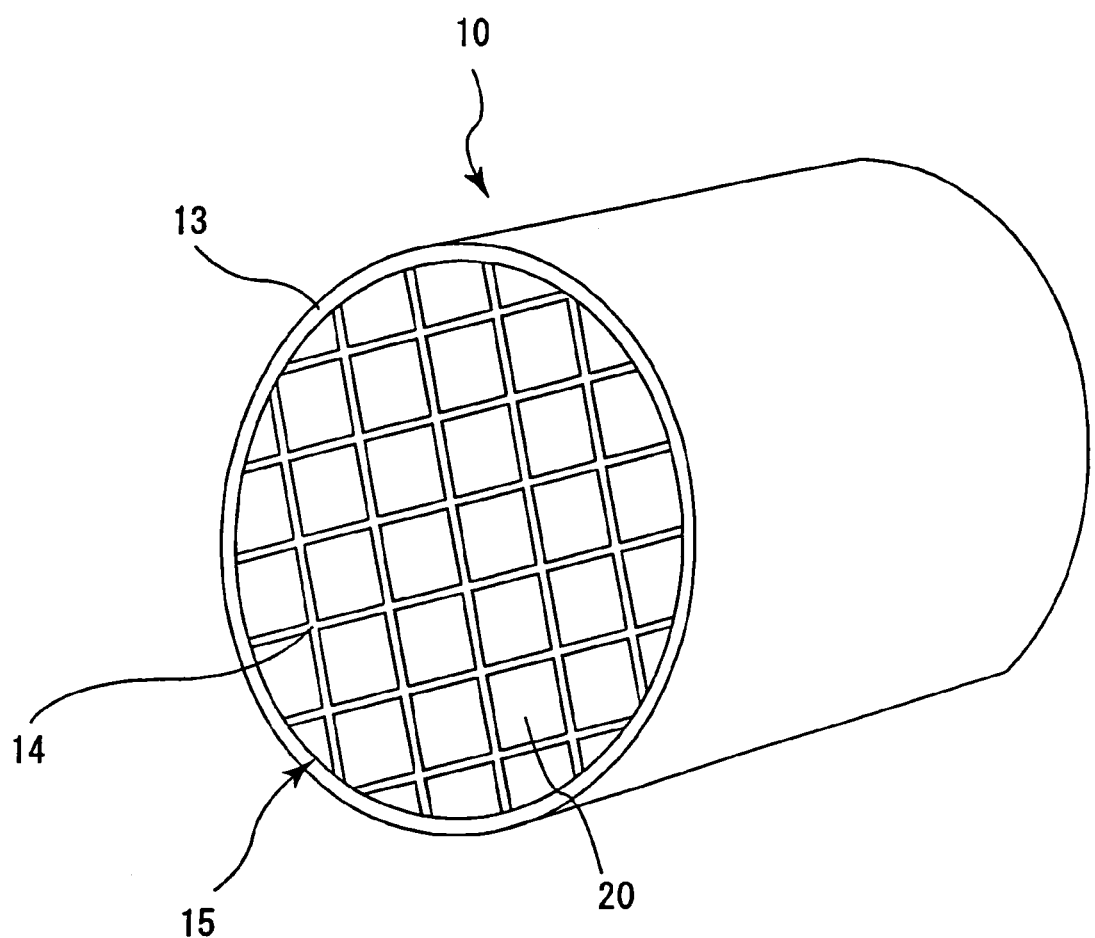
FIG. 11 is a schematic diagram of a honeycomb structure according to an embodiment of the present invention.
Figure 12A:
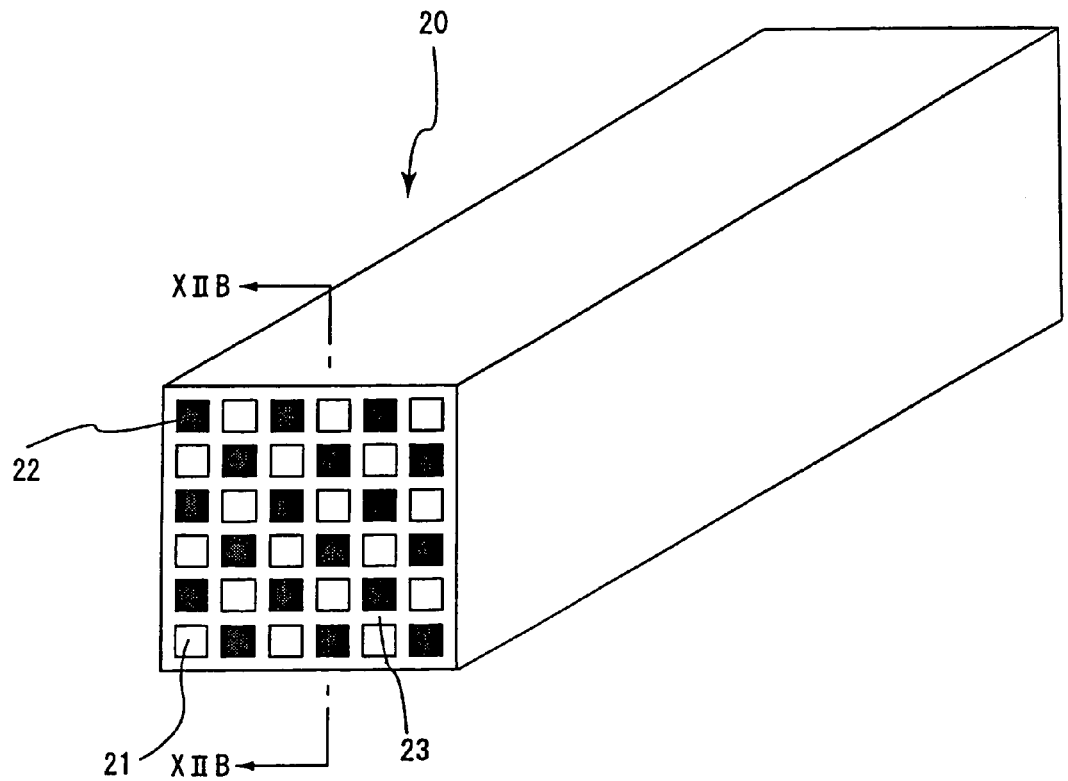
FIG. 12A is a schematic diagram of a porous ceramic member constituting a part of a honeycomb structure according to an embodiment of the present invention.
Figure 12B:
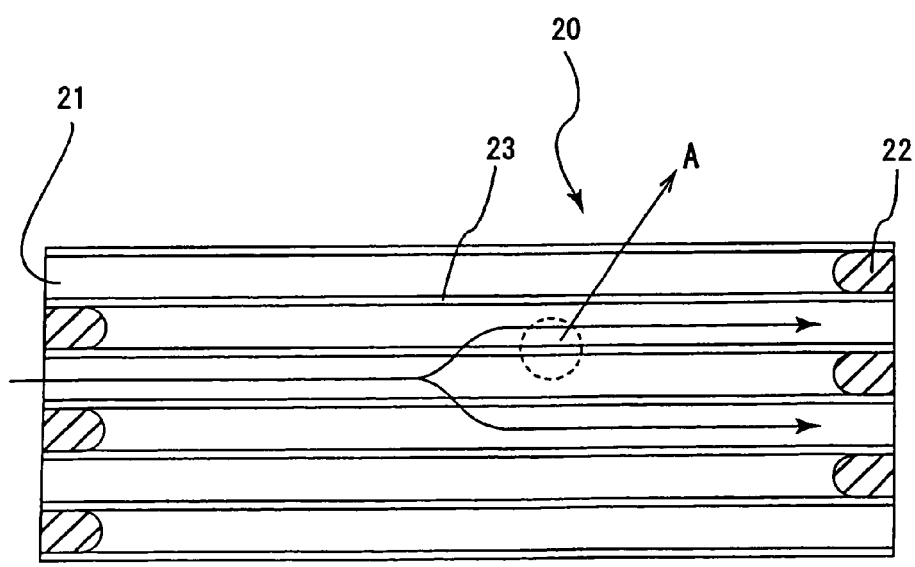
FIG. 12B is a cross view cut along the line XIIB-XIIB.

Next, the honeycomb structure according to an embodiment of the present invention will be explained. The honeycomb structure includes the porous body according to the embodiment of the present invention. The honeycomb structure will be explained by referring to the drawings. FIG. 11 is a perspective view schematically showing a honeycomb structure according to an embodiment of the present invention, FIG. 12A is a perspective view schematically showing an example of a porous ceramic material (porous body) constituting the honeycomb structure according to the embodiment of the present invention, and FIG. 12B is a cross sectional view of FIG. 12A taken along a the line XII B-XII B.

As shown in FIG. 11, the honeycomb structure 10 includes a ceramic block 15 constituted by a plurality of porous ceramic members 20 bound with each other via a plurality of sealant layers 14, and a circumferential sealing material layer 13 formed on the circumference of the ceramic block 15. In this porous ceramic member 20, as shown in FIG. 12B, a plurality of through holes are disposed in parallel in the longitudinal direction, and partitions 23 separating the through holes 21 from each other function as a filter. Here, the porous ceramic member 20 includes the above-mentioned porous bodies 107A, 107B, 108A, 108B, 109A, or 109B.

That is, the through holes 21 formed in the porous ceramic member 20 are sealed by a sealing medium 22 either on the inlet side or the outlet side of the exhaust gas, so that exhaust gas flowed into one through hole 21 passes, without fail, through the partitions 23 separating the through holes 21 to be flowed out from another through hole 21. Additionally, a sealing material layer 13 is provided with the aim of preventing the exhaust gas from leaking from the circumferential part of the ceramic block 15 when the honeycomb structure 10 is disposed in the exhaustion passage of an internal combustion engine.

Figure 13:
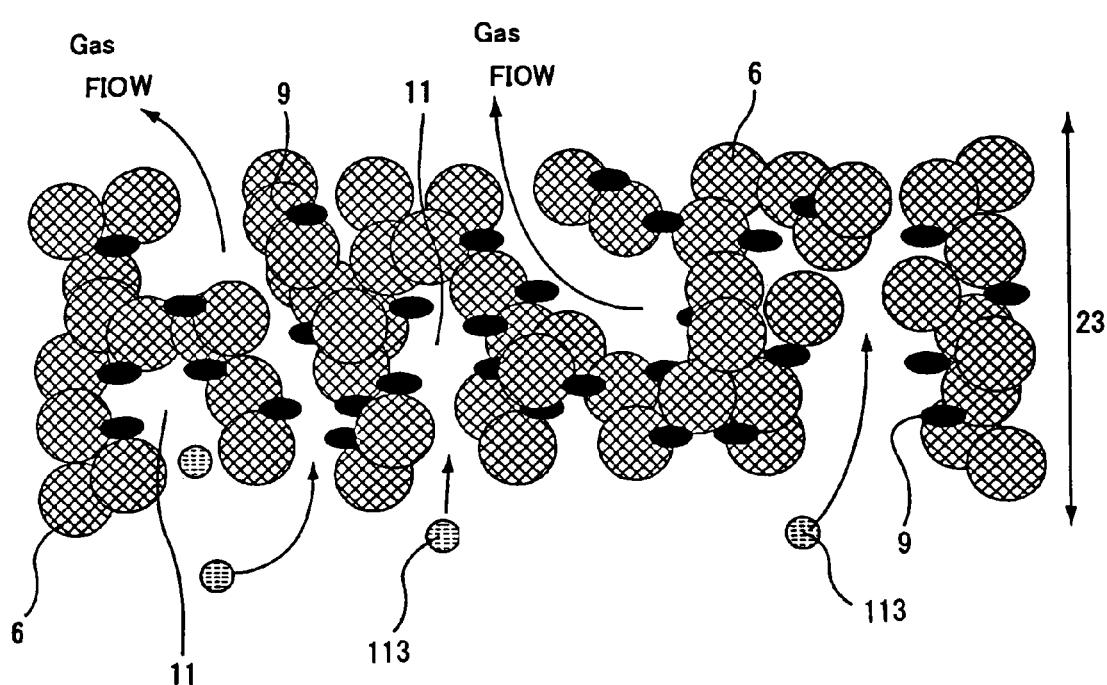
FIG. 13 is an enlarged view of the circled portions of FIG. 12B and the FIG. 16B.

An enlarged cross-sectional view of the partition 23 of the porous ceramic member 20 is shown in FIG. 13. For the partition, the previously explained porous bodies 107A, 107B, 108A, 108B, 109A, or 109B can be used. In FIG. 13, the partition is comprised of skeleton particles 6, void spaces 11 formed by the particles 6, and an inorganic compound 9 present in the inner wall of the void space. Soot 113 is to be trapped in the inside of the void spaces 11. In this specific embodiment, the void space 11 can be enlarged to increase the amount of soot to be trapped without causing lowering of the strength. Therefore, the life of the filter can be extended when the honeycomb structure is used as an exhaust gas filter.

When a honeycomb structure 10 having such a configuration is disposed in an exhaust passage of an internal combustion engine, particulates in the exhaust gas emitted from the internal combustion engine are trapped by the partition 23 when passing through the honeycomb structure 10. Since such a honeycomb structure 10 is extremely excellent in heat resistance and easily recycled, it is used in various heavy vehicles, diesel-powered vehicles, etc.

The materials constituting the sealant layer 14 are not particularly limited. For example, those comprising an inorganic binder, an organic binder, an inorganic fiber, and inorganic particles can be mentioned.

Examples of the above-mentioned binder include silica sol, titania sol and alumina sol. These may be used alone or in combination of two or more. Out of the inorganic binders, silica sol is desirable.

Examples of the above-mentioned binder include polyvinyl alcohol, methyl cellulose, ethyl cellulose, and carboxymethyl cellulose. These may be used alone or in combination of two or more. Out of the organic binders, carboxymethyl cellulose is desirable.

Examples of the above-mentioned inorganic fiber include ceramic fibers such as silica-alumina, mullite, alumina, and silica. These may be used alone or in combination of two or more. Out of the inorganic fibers, silica-alumina fiber is desirable.

Examples of the above-mentioned inorganic particles include carbide, and nitride. Specifically, inorganic a powder or a whisker comprising carbon nitride, silicon carbide, and boron nitride, can be mentioned. These may be used alone or in combination of two or more. Out of the inorganic particles, carbon nitride which is excellent in thermal conductivity is desirable.

Furthermore, the sealant layer 14 may contain a forming material. The reason is that the thermal expansion coefficient of the sealant layer 14 can be adjusted since the porosity of the sealant layer 14 (containing a foaming material) can be changed.

The foaming material is not particularly limited as long as the material is decomposed when heated in use, and, for example, a publicly known foaming material, such as ammonium hydrogencarbonate, ammonium carbonate, amyl acetate, butyl acetate, and diazoaminobenzene.

Additionally, the sealant layer 14 may contain a resin such as a thermoplastic resin and a thermosetting resin, balloons of an inorganic substance or an organic substance, etc. This is because the porosity of the sealant layer 14 can be controlled and the thermal expansion coefficient of the sealant layer 14 can be adjusted.

The above-mentioned thermoplastic resin is not particularly limited. For example, an acryl resin, a phenoxy resin, polyether sulfone, and polysulfone may be mentioned. The thermosetting resin is not particularly limited. For example, epoxy resin, phenol resin, polyimide resin, polyester resin, bismaleimide resin, polyolefin-based resin, and polyphenylene ether resin may be used.

The shapes of these resins are not particularly limited. For example, any shape such as a spherical shape, an elliptic spherical shape, a cubical shape, an indeterminate lump form, a cylindrical shape, and a plate-like shape can be used.

Further, when the resin is a spherical shape, the average particle size is desirably about 30 to 300 μm.

The above-mentioned "balloon" refers to a concept including bubbles or hollow spheres. The balloon of an organic substance is not particularly limited, and, for example, acryl balloon and polyester balloon may be mentioned. The balloon of an inorganic substance is not particularly limited, and, for example, alumina balloon, glass microballoon, silas balloon, fly ash balloon (FA balloon), and mullite balloon may be mentioned.

The shape, the average particle size, etc. of these balloons are preferably the same as the above-mentioned resins.

Although, the shape of the ceramic block 15 in the honeycomb structure 10 in FIG. 11 is cylindrical, the shape of the ceramic block in the honeycomb structure of the present invention is not limited to a cylindrical shape. Any shape such as elliptic cylindrical shape, and prismatic shape can be mentioned.

The circumferential sealing material layer 13 formed on the circumference of the ceramic block 15 is not particularly limited. For example, the same material as the sealant layer 14 can be used. Further, in the pores of the honeycomb structure according to the embodiments of the present invention, a catalyst may be supported which can purify CO, HC, NOx, etc. in exhaust gas.

Figure 14:
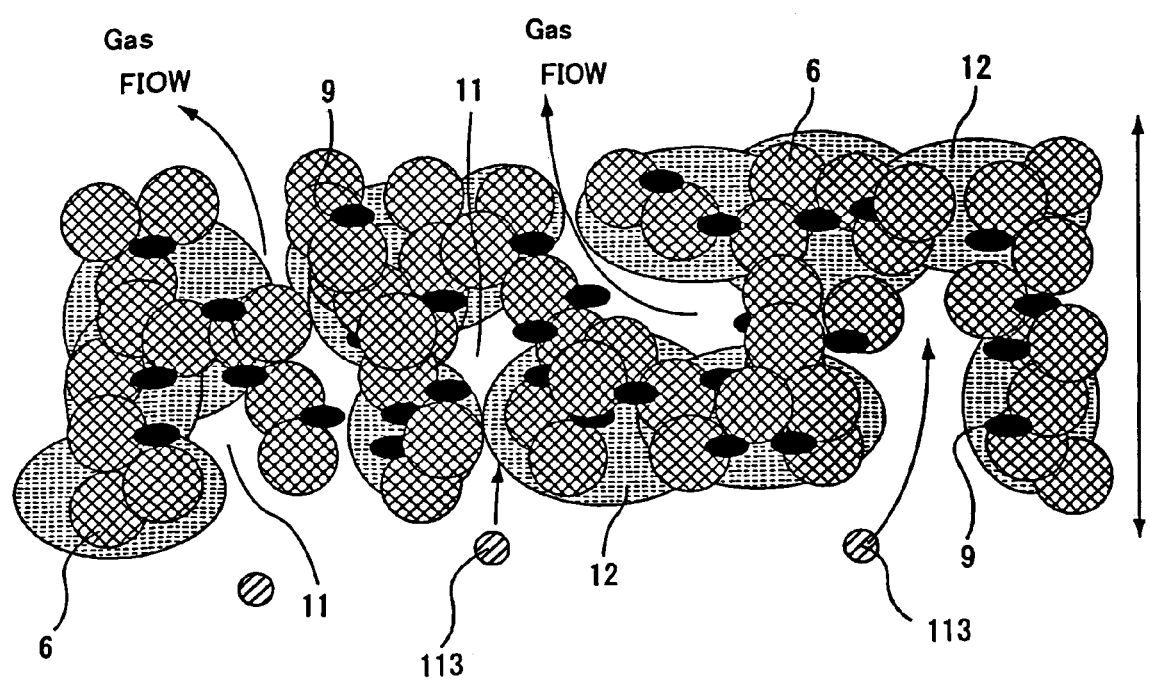
FIG. 14 is an enlarged view of the circled portions of FIG. 12B and FIG. 16B in the case where a catalyst is added.

An enlarged cross-sectional view of the partition to which the catalyst 12 is added is shown in FIG. 14. The partition is comprised of skeleton particles 6, void spaces 11 formed by the particles 6, and an inorganic compound 9 present in the inner wall of the void space. Soot 113 is to be trapped in the inside of the void spaces 11. The inorganic compound 9 and the catalyst 12 are chemically bonded, and hence can prevent detaching and falling of the catalyst.

Due to the fact that such a catalyst 12 is provided, the honeycomb structure 10 according to the embodiment of the present invention functions as a filter to collect particulates in exhaust gas, and also as a catalyst support for purifying the previously mentioned CO, HC, NOx, etc. in exhaust gas.

As for the catalyst 12, for example, a precious metal such as platinum, palladium, and rhodium can be mentioned. The honeycomb structure according to the embodiment of the present invention in which a catalyst including one out of the above-mentioned metals is supported functions as a gas purification device in the same manner as a conventionally known DPF (diesel particulate filter) with a catalyst. Therefore, a detailed explanation of the case where the honeycomb structure according to the embodiment of the present invention functions as a catalyst supporter will be omitted here.

The catalysts which the honeycomb structure according to the embodiment of the present invention can support are not limited to the above-mentioned metals, and any catalyst as long as it can purify CO, HC, and NOx in exhaust gas can be supported.

Although the open area ratio at the end face of the inlet side and that at the end face of the outlet side are identical in the above-explained honeycomb structure 10 by referring to the drawings, in the honeycomb structure according to the embodiment of the present invention, the open area ratios at the end faces of the two sides are not necessarily identical. For example, the open area ratio at the end face of the inlet side may be greater than that at the end face of the outlet side.

The open area ratio at the end face here means a ratio of the total area occupied by the group of the through holes which are open at one end face.

Next, an example of the manufacturing method of the honeycomb structure according to an embodiment of the present invention will be explained by referring to FIGS. 15A to 15D.

Figure 15A:
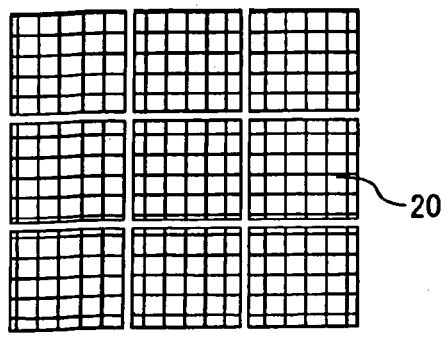
FIGS. 15A to 15D are illustrations showing the manufacturing method of a honeycomb structure according to an embodiment of the present invention.
Figure 15B:
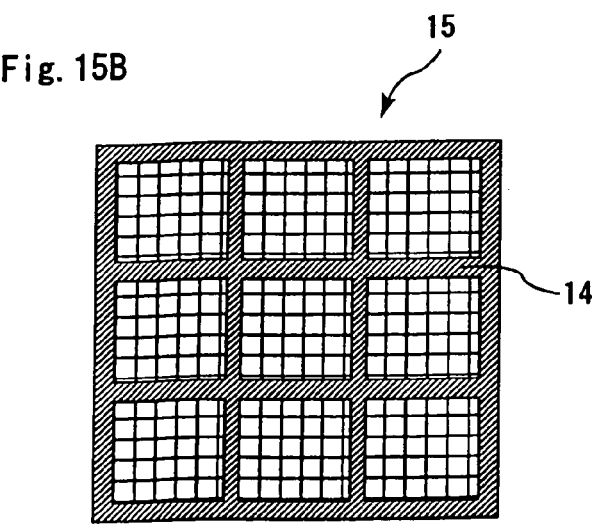

The porous ceramic member 20 is produced according to the above-mentioned manufacturing method of the porous body (FIG. 15A). In producing the porous ceramic member 20, after drying a produced body using a microwave dryer or the like, a sealing treatment is conducted to fill a sealing material into predetermined through holes. The drying step using, for example, a microwave dryer or the like is performed again, followed by a degreasing step and a calcining step to produce a porous ceramic member 20.

The sealing material is not particularly limited. For example, the same as the above-mentioned mixture composition may be mentioned.

Next, a ceramic laminated body will be produced. In this case, an adhesive paste which will become a sealant layer 14 is coated on the porous ceramic member 20 so as to have a uniform thickness, and a step of sequentially laminating other porous ceramic members 20 on which an adhesive paste is coated will be repeated to prepare a prismatic laminated body of a predetermined size.

Then, this ceramic laminated body is heated under the condition at about 50 to 100° C. for about one hour to dry and solidify the above-mentioned adhesive paste layer to make it a sealant layer 14, and subsequently by cutting the circumferential portion into a shape as shown in FIG. 1 using, for example, a diamond cutter, to produce a ceramic block 15.

The materials constituting the sealant layer 14 are not particularly limited. For example, an adhesive paste containing an inorganic binder, an organic binder, inorganic fiber and inorganic particles may be used.

The above-mentioned adhesive paste may contain a little amount of water, solvent, etc. Usually, such water, solvent, etc. are almost dispersed by heating performed after the adhesive paste is coated.

Furthermore, the lower limit of the content of the above-mentioned inorganic binder as a solid is desirably about 1% by weight, and more desirably about 5% by weight. Meanwhile, the upper limit of the content of the inorganic binder as a solid is desirably about 30% by weight, more desirably about 15% by weight, and further desirably about 9% by weight. When the content of the inorganic binder is less than about 1% by weight, lowering of the adhesive strength may be caused, and meanwhile, when it exceeds 30% by weight, lowering of heat conductivity may be caused.

The lower limit of the content of the above-mentioned organic binder as a solid is desirably about 0.1% by weight, more desirably about 0.2% by weight, and further desirably about 0.4% by weight. Meanwhile, the upper limit of the content of the organic binder as a solid is desirably about 5.0% by weight, more desirably about 1.0% by weight, and further desirably about 0.6% by weight. When the content of the organic binder is less than about 0.1% by weight, control of the migration of the sealant layer 14 may become difficult. Meanwhile, when it exceeds about 5.0% by weight, when the sealant layer 14 is exposed to a high temperature, the organic binder will be burned down and the adhesive strength may be reduced.

The lower limit of the content of the inorganic fiber as a solid is desirably about 10% by weight, more desirably 20% by weight. Meanwhile, the upper limit of the content of the inorganic fiber as a solid is desirably about 70% by weight, more desirably about 40% by weight, further desirably about 30% by weight. When the content of the inorganic fiber is less than about 10% by weight, elasticity and strength may be deteriorated. Meanwhile, when it exceeds about 70% by weight, lowering of heat conductivity may be caused and the effect as an elastic body may be reduced.

The lower limit of the content of the inorganic particles as a solid is desirably about 3% by weight, more desirably about 10% by weight, further desirably about 20%. Meanwhile, the upper limit of the content of the inorganic particles as a solid is desirably about 80% by weight, more desirably about 60% by weight, further desirably about 40% by weight. When the content of the inorganic fiber is less than about 3% by weight, lowering of heat conductivity may be caused. Meanwhile, when it exceeds about 80% by weight, the adhesive strength may be reduced when the sealant layer 14 is exposed to a high temperature.

Further, the lower limit of the shot content of the inorganic fiber is desirably about 1% by weight, and the upper limit is desirably about 10% by weight, more desirably about 5% by weight, further desirably about 3% by weight. The lower limit of the fiber length is desirably about 1 µm, the upper limit is desirably about 100 mm, more desirably about 1000 µm, further desirably about 500 µm.

It is difficult from the manufacturing point of view to set the shot content at less than about 1% by weight, and when the shot content exceeds about 10% by weight, the wall surface of the porous ceramic member 20 may be damaged. When the fiber length is less than about 1 µm, it is difficult to form a honeycomb structure 10 having elasticity, and when it exceeds 100 mm, the fiber is likely to take a pill-like form, causing poor dispersion of the inorganic particles, and it is difficult to reduce the thickness of the sealant layer 14.

The lower limit of the particle size of the inorganic powder is desirably about 0.01 µm, more desirably about 0.1 µm. Meanwhile, the upper limit of the particle size of the inorganic particles is desirably about 100 µm, more desirably 15 µm, further desirably about 10 µm. When the particle size of the inorganic particles is less than about 0.01 µm, the cost may be increased. Meanwhile, when the particle size of the inorganic particles exceeds about 100 µm, the filling rate may be deteriorated, and hence adhesive force and heat conductivity may be lowered.

This adhesive paste may contain, in addition to the above-mentioned inorganic fiber, inorganic binder, organic binder and inorganic particles, about 35 to 65% by weight of water, other solvents such as acetone, and alcohol base on the total weight, and the viscosity of the adhesive paste is desirably about 15 to 25 Pa·s (10,000 to 20,000 cps (cP)).

Figure 15C:
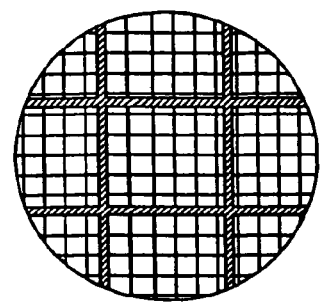

Next, the circumference of the thus obtained ceramic block 15 is cut so that the block has a cylindrical form. (FIG. 15C)

Figure 15D:
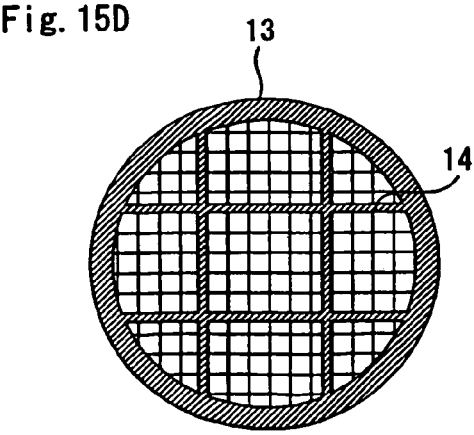

Then, the sealing material forming step to form a layer of the sealing material layer is performed (FIG. 15D). In the sealing material forming step, first, the ceramic block 15 whose circumference is cut so that the block has a cylindrical form is rotated around the longitudinal axis. Although the rotating speed of the ceramic block 15 is not particularly limited, it is desirably about 2 to 10 revolutions per minute.

A sealing paste is subsequently adhered to the circumferential portion of the rotating ceramic block 15. The sealing paste is not particularly limited, and the same one as the above-mentioned adhesive paste may be mentioned.

Then, the thus formed sealing paste layer is dried at a temperature of about 120° C. to cause water to evaporate so as to make it a sealing material layer 13, which finalizes the production of the honeycomb structure 10 according to the embodiment of the present invention in which the sealing material layer is formed on the circumferential portion of the ceramic block 15.

While the above-described honeycomb structure 10 is one in which a plurality of porous ceramic members 20 are bound together via the sealant layers to constitute a ceramic block 15, and a sealing material layer 13 is formed on the circumference of the ceramic block, the honeycomb structure according to the embodiment of the present invention may include a single porous ceramic member. That is, there is no sealant layer in this case, and, for example, a single porous ceramic member itself is cylindrical. Hereinafter, the honeycomb structure shown in FIG. 11 will be referred to as a group-type honeycomb structure, and the honeycomb structure to be described below will be referred to as a single unit-type honeycomb structure.

Figure 16A:
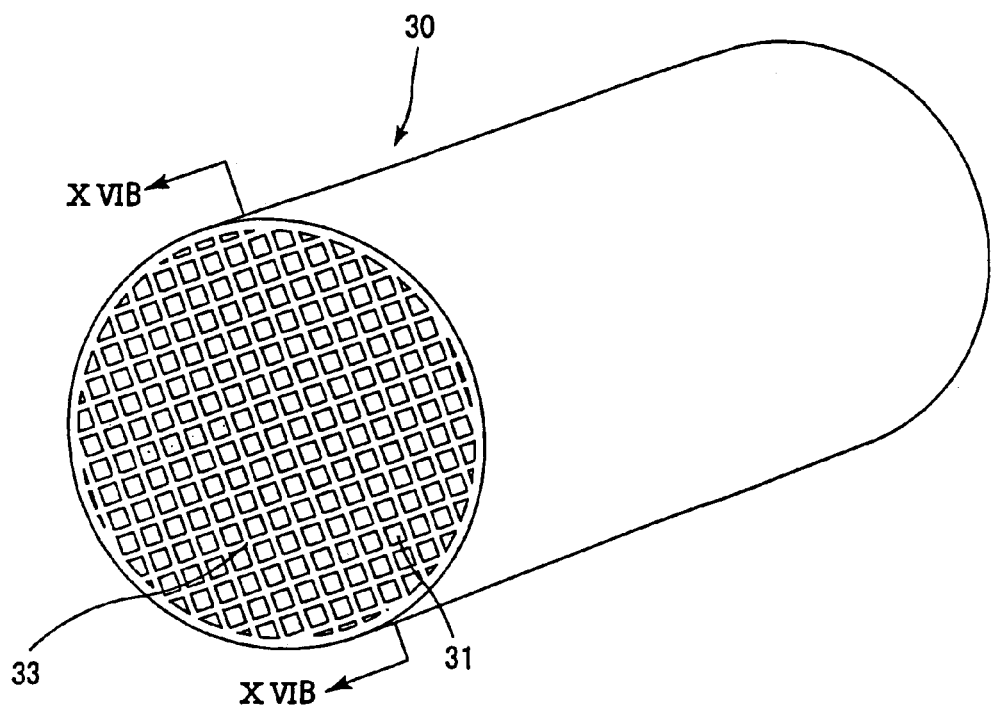
FIG. 16A is a perspective view diagrammatically showing an example of a single unit-type honeycomb structure.
Figure 16B:
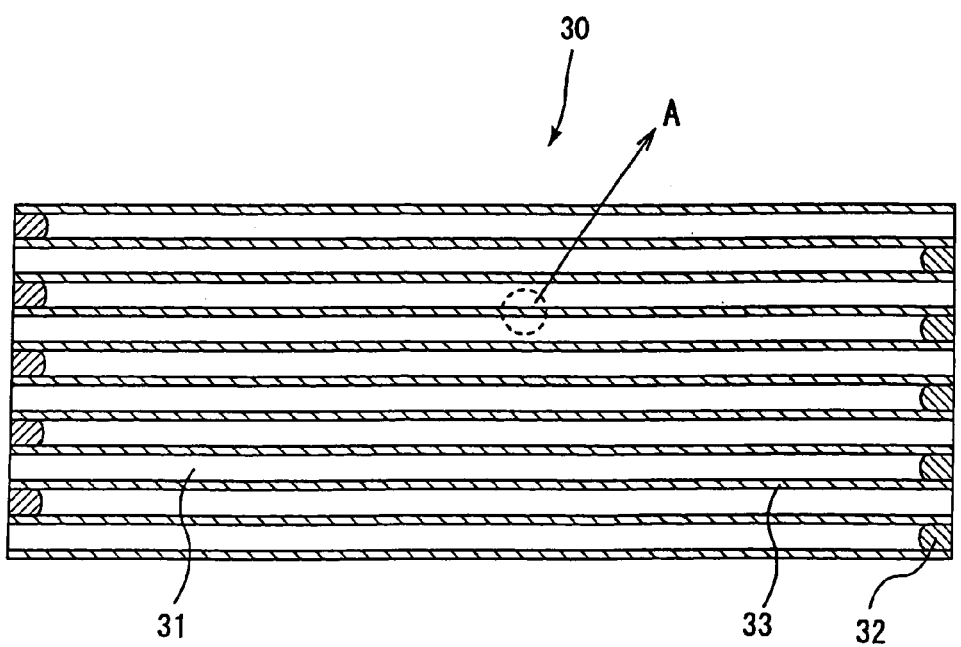
FIG. 16B is a cross sectional view cut along the line XVIB-XVIB.

FIG. 16A is a perspective view diagrammatically showing an example of a single unit-type honeycomb structure, and FIG. 16B is a cross sectional view cut along the line XVI B-XVI B.

As shown in FIG. 16A, the honeycomb structure 30 is a cylindrical body including a single porous ceramic member in which a plurality of through holes 31 are arranged in parallel in the longitudinal direction, each of them are separated by a wall portion 33, wherein the end portion of one side or the other side of each through hole is filled with a sealing medium 32 so that the entire wall portion 33 function as a particle collection filter. That is, the through holes 31 formed in the honeycomb structure 30 are sealed on either the inlet side or the outlet side for the exhaust gas as shown in FIG. 16B so that the exhaust flowed into one through hole 31 never fails to pass the wall portion 33 separating the through holes 31 so as to be flowed out from another through hole 31. The porous body constituting the honeycomb structure 30 includes (one of) the above-described specific examples of the porous body.

When a honeycomb structure 30 having such a configuration is disposed in an exhaust passage of an internal combustion engine, particulates in exhaust gas emitted from the internal combustion engine are trapped by the wall portion 33 when passing through the honeycomb structure, and the exhaust gas is purified. Since such a honeycomb structure 10 is extremely excellent in heat resistance and is easily recycled, it is used in various heavy vehicles, diesel-powered vehicles and the like. Although the honeycomb structure 30 shown in FIG. 16A has a cylindrical shape, any shape, for example, elliptic cylindrical shape and prismatic shape can be used for the honeycomb structure 30.

Further, a sealing material layer may be formed on the circumference of the honeycomb structure 30 as in the honeycomb structure 10 in FIGS. 11A and 11B. The sealing material layer is not particularly limited. For example, the same material as the sealing material layer 13 of the honeycomb structure 10 may be mentioned.

In the pores of the honeycomb structure 30, a catalyst may be supported which can purify CO, HC, NOx, etc. in the exhaust gas. As examples of such a catalyst, the same catalysts as those used in the honeycomb structure 10 of FIGS. 11A and 11B may be mentioned.

Although in the honeycomb structure 30, the open area ratio at the end face of the inlet side and that at the end face of the outlet side are identical, the open area ratios at the end faces of two sides are not necessarily identical in the honeycomb structure of the present invention. For example, the open area ratio at the end face of the inlet side may be greater than that at the end face of the outlet side.

The open area ratio at the end face here means a ratio of the total area occupied by the group of the through holes which are open at one end face.

The above-mentioned honeycomb structure can be produced by the manufacturing method of the previously mentioned porous bodies according to the embodiment of the present invention. With regard to this honeycomb structure, there is no step of binding produced porous bodies, and the honeycomb structure can be produced at one time.

That is, after drying the produced form using a microwave dryer or the like, a sealing treatment is conducted to fill a sealing material into predetermined through holes, and the drying step using a microwave dryer or the like is performed again, followed by a degreasing step and a calcining step to produce a porous ceramic member 30. Thereafter, a sealing material layer may be formed on the circumference thereof, if necessary.

EXAMPLES

The examples are explained. The present invention is not limited to these examples.

Preparation of pore forming materials for a porous body A to H is explained.

(1) A pore forming material for a porous body F including acryl particles with 80% by volume of acryl and 20% by volume of porosity; a pore forming material for a porous body G including acryl particles with 40% by volume of acryl and 60% by volume of porosity; and a pore forming material for a porous body H including acryl particles with 30% by volume of acryl and 70% by volume of porosity were prepared.

(2) The pore forming material H for a porous body was provided in an alumina slurry having an average particle size of 0.1 μm and a concentration of 15% by weight to immerse alumina into the pore forming material under degassing. After dehydrating the slurry, the particles were dried for three hours at 80° C. to obtain a pore forming material for a porous body D.

(3) The pore forming material for a porous body D was provided in an alumina slurry having an average particle size of 0.1 μm and a concentration of 15% by weight to alumina in the pore forming material under degassing, and after dehydrating the slurry, the step of drying the particles for three hours at 80° C. was repeated twice (i.e., the step of the above (2) was repeated for three times) to obtain a pore forming material for a porous body A.

(4) By repeating the above step (2) for five times, a pore forming material for a porous body C was obtained.

(5) Alumina particles with a porous structure, a porosity of 30%, and an average particle size of 40 μm were provided in an acryl slurry having a concentration of 15% by weight to immerse acryl into the particles under gassing, and after dehydrating the slurry, the particles were dried for three hours at 80° C. to obtain a pore forming material for a porous body E.

(6) The pore forming material for a porous body E was provided in a slurry having an acryl concentration of 15% by weight to immerse acryl into the pore forming material under degassing, and after dehydrating the slurry, the step of drying the particles for three hours at 80° C. was repeated twice (i.e., the step of the above (5) was repeated for three times) to obtain a pore forming material for a porous body B.

By these steps (1) to (6), pore forming materials for a porous body A to H were prepared. The composition of the pore forming materials for a porous body A to H is as shown in Table 1 below. The average particle sizes of the pore forming materials for a porous body A to H are all 40 μm.

TABLE 1

| Pore forming material for a porous body | Porosity (volume %) | Organic polymer (Acryl) (volume %) | Inorganic particle (Alumina) (volume %) | Ratio of volume (organic polymer/inorganic particle) |
| --- | --- | --- | --- | --- |
| A | 20 | 30 | 50 | 0.6 |
| B | 20 | 10 | 70 | 0.14 |
| C | 40 | 30 | 30 | 1.0 |
| D | 60 | 30 | 10 | 3.0 |

TABLE 1-continued

| Pore forming material for a porous body | Porosity (volume %) | Organic polymer (Acryl) (volume %) | Inorganic particle (Alumina) (volume %) | Ratio of volume (organic polymer/inorganic particle) |
|---|---|---|---|---|
| E | 60 | 10 | 30 | 0.33 |
| F | 20 | 80 | — | — |
| G | 60 | 40 | — | — |
| H | 70 | 30 | — | — |

Example 1

(1) 5950 parts by weight of α-type silicon carbide powder having an average particle size of 40 μm and 2550 parts by weight of β-type silicon carbide powder having an average particle size of 0.5 μm were wet blended, and 600 parts by weight of an organic binder (methyl cellulose) and 1800 parts by weight of water were further added to the mixture and kneaded to obtain a kneaded substance. Then, to the above kneaded substance, 1450 parts by weight of the pore forming material for a porous body A, 150 parts by weight of a plasticizer (glycerin from NOF Corporation), and 330 parts by weight of a lubricant (Unilube from NOF Corporation) were further kneaded, and subsequently an extrusion was performed to obtain a molded product. Then, the molded product was dried using a microwave dryer, and after a paste having a composition same as the molded product was filled into predetermined through holes, the product was dried again with a dryer, degreased for three hours at 400° C. (programming rate: 5° C./min), and calcined for three hours at 2000° C. in argon atmosphere at a normal pressure to produce a porous ceramic member (porous body), as shown in FIG. 15C, including a calcined body of silicon carbide (size: 34.3 mm×34.3 mm×150 mm; number of through holes: 31/cm²; and partition thickness: 0.3 mm).

(2) Using a heat resistant adhesive paste including 100 parts by weight of a mixture containing 17.6% by weight of alumina fiber with a fiber length of 0.2 mm, 61.0% by weight of silicon carbide particles having a particle size of 0.6 μm, 9.1% by weight of silica sol, 2.3% by weight of calboxy methyl cellulose, and 10% by weight of ammonium hydrogencarbonate as a foamed material, to which 20 parts by weight of water is added, a plurality of the above-mentioned porous ceramic members were bound and then cut using a diamond cutter according to the method already explained in the description of the manufacturing method of the honeycomb structure to produce a cylindrical ceramic block with a diameter of 165 mm as shown in FIG. 15D.

Then, 23.3% by weight of ceramic fiber including alumina silicate as an inorganic fiber (shot content ratio: 3%, fiber length: 0.1 to 100 mm); 30.2% by weight of silicon carbide powder with an average particle size of 0.3 μm as inorganic particles; 7% by weight of silica sol (content ratio of $SiO_2$ in sol: 30% by weight) as an inorganic binder; 0.5% by weight of carboxymethyl cellulose as an organic binder; and 39% by weight of water were mixed and kneaded to prepare a sealing paste.

Then, a sealing paste layer having a thickness of 1.0 mm was formed on the circumferential part of the above-mentioned ceramic block using the above-mentioned sealing paste. The sealing paste layer was dried at 120° C. to produce a cylindrical honeycomb structure as shown in FIG. 11.

Examples 2 to 5

A honeycomb structure was produced in the same manner as Example 1 except that the blended amount of an α-type silicon carbide powder with an average particle size of 40 μm (SiC coarse powder), that of an β-type silicon carbide with an average particle size of 0.5 μm (SiC fine powder), and that of the pore forming material for a porous body, and the kinds of the pore forming material for a porous body were changed as shown in Table 2.

TABLE 2

|  | αtype SiC (particle diameter 40 μm) | βtype SiC (particle diameter 0.5 μm) | Methyl Cellulose | Pore forming material for a porous body | | | | |
|---|---|---|---|---|---|---|---|---|
|  |  |  |  | Type | Amount of composition | Amount of acryl | glycerin | water |
| Example 1 | 5950 | 2550 | 600 | A | 1450 | 190 | 150 | 1800 |
| Example 2 | 4550 | 1950 | 600 | B | 3940 | 135 | 150 | 1800 |
| Example 3 | 4550 | 1950 | 600 | C | 2040 | 410 | 150 | 1800 |
| Example 4 | 4550 | 1950 | 600 | D | 950 | 410 | 150 | 1800 |
| Example 5 | 3220 | 1380 | 600 | E | 2600 | 200 | 150 | 1800 |
| Comparative example 1 | 5950 | 2550 | 600 | F | 500 | 500 | 150 | 1800 |
| Comparative example 2 | 4550 | 1950 | 600 | G | 550 | 550 | 150 | 1800 |
| Comparative example 3 | 5950 | 2550 | 600 | H | 190 | 190 | 150 | 1800 |

Amounts are desribed in terms of parts by weight.
All Examples and all Comparative examples contain 330 parts by weight of lubricant whose trade name is Uniloop.

Example 6

Silica was used as inorganic particles in the same manufacturing method as the pore forming material for a porous body A. 6000 parts by weight of an α-type silicon carbide powder with an average particle size of 40 μm (SiC coarse powder); 1000 parts by weight of Si with an average particle size of 0.5 μm; 1000 parts by weight of silica with an average particle size of 1 μm; and 1500 parts by weight of a pore forming material for a porous body A were mixed and calcined at 1800° C. It is inferred that SiC particles are bound together with Si or Si compound, and that $SiO_2$ are locally present on the neck portions of the structure, so that a porous structure in which $SiO_2$ being locally present in the neck portions are exposed to the void spaces can be obtained. Further, it is inferred that no cracking occurs in a honeycomb filter having this porous structure. The grounds for this inference are obtained from the experiment results of Examples 1 to 5.

Comparative Examples 1 to 3

A honeycomb structure was produced in the same manner as Example 1 except that the blended amount of an α-type silicon carbide powder with an average particle size of 40 μm (SiC coarse powder), that of an β-type silicon carbide with an average particle size of 0.5 μm (SiC fine powder), and that of the pore forming material for a porous body, and the kinds of the pore forming material for a porous body were changed as shown in Table 2, and further that the temperature for calcination was changed from 2000° C. to 2200° C.

Regarding the honeycomb structures of Examples 1 to 5 and Comparative Examples 1 to 3, the shapes of the pore forming materials for a porous body after extrusion were observed using an LV-SEM. As a result, the molded bodies in Examples 1 to 5 and Comparative Examples 1 and 2, the pore forming materials for a porous body were not deformed. Meanwhile, the molded body in Comparative Example 3, the pore forming material for a porous body was crushed.

Further, the honeycomb structures in Examples 1 to 5 and Comparative Examples 1 to 3 were observed with eyes as to whether cracks were occurred or not when the degreasing step was completed. As a result, as shown in Table 3, no crack was observed in the molded bodies in Examples 1 to 5 and Comparative Example 3, while there were cracks in Comparative Examples 1 and 2. Further, samples of the molded bodies for honeycomb structures of Examples 1 to 5 and Comparative Examples 1 to 3 were each cut into a 1 cm cube, and after making each of them into a powder, they were put into a calorimeter and heated from to 20 to 400° C. at a programming rate of 5° C./min to calculate the total amount of heat generated at the time of degreasing. The results were shown in Table 3.

TABLE 3

| | Occurrence of Cracking while firing | Porosity after firing (volume %) | Total calorific value generated while firing (cal/cm$^3$) |
|---|---|---|---|
| Example 1 | NON | 50 | 58.7 |
| Example 2 | NON | 59 | 53.8 |
| Example 3 | NON | 60 | 81.7 |
| Example 4 | NON | 61 | 91.9 |
| Example 5 | NON | 70 | 79.0 |
| Comparative example 1 | Occur | — | 105 |
| Comparative example 2 | Occur | — | 114 |
| Comparative example 3 | NON | 44 | 66.1 |

In addition, with regard to the honeycomb structures in Examples 1 to 5 and Comparative Example 3, the porosities were measured using a porosimeter. The results are shown in Table 3.

As is clear from these results, since the pore forming materials for a porous body according to the embodiment of the present invention were used in Examples 1 to 5, it was possible to produce honeycomb structures with a high porosity exceeding 50% by volume without causing cracks. Further, even if the calcination temperature was reduced from 2200° C. to 2000° C., they were sufficiently calcined. Meanwhile, in Comparative Examples 1 and 2, cracks were caused when the degreasing step was completed. The reason is considered that since the pore forming materials for a porous body used in Comparative Examples contain a large amount of organic polymers (the amount of acryl), the temperatures of the molded bodies were rapidly increased to a high temperature since the organic polymers were rapidly burnt at the time of degreasing to cause cracks. (The numerical values of Comparative Examples indicated by the calorimeter were higher than those of Examples.) Further, in Comparative Example 3, since a pore forming material for a porous body with a high porosity consisting only of an organic polymer (acryl resin) was used, the pore forming material for a porous body were crushed at the time of extrusion molding. While the target porosity was 50% or more, the actual porosity of the obtained honeycomb structure was 44%, failing to ensure a sufficient porosity.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A porous body comprising:
a ceramic body produced by calcining a molded body comprising a mixture including a plurality of skeleton particles and a plurality of pore forming particles comprising an organic polymer and a plurality of inorganic particles,
wherein the molded body is calcined in a temperature range sufficiently high for a sufficient duration such that the skeleton particles directly bind with each other and form inner surfaces and void spaces and that the inorganic particles of the pore forming particles form a plurality of inorganic compound components present on the inner surfaces formed by the skeleton particles directly bound with each other and comprising an inorganic compound, each of the skeleton particles comprises a ceramic selected from the group consisting of a nitride ceramic, a carbide ceramic and an oxide ceramic, the plurality of inorganic particles comprises at least one inorganic material selected from the group consisting of a nitride ceramic, a carbide ceramic, an oxide ceramic, a metal and a metal compound, and the ceramic of the skeleton particles is different from the inorganic compound of the inorganic compound components.

2. The porous body according to claim 1, wherein a porosity of the porous body is at least about 45% and at most about 85%.

3. The porous body according to claim 1, wherein the void spaces have a major axis which is equal to or larger than a major axis of the skeleton particles.

4. The porous body according to claim 3, wherein the plurality of skeleton particles comprises silicon carbide particles and the plurality of inorganic compound components comprises at least one selected from alumina, mullite, silica, titania, and silica alumina.

5. The porous body according to claim 3, wherein the inorganic compound components are bound on neck portions of the skeleton particles directly bound with each other.

6. The porous body according to claim 3, wherein the inorganic compound components are crystallized from a liquid phase and are present on neck portions of the skeleton particles directly bound with each other.

7. A porous body produced by the process comprising the steps of:
preparing a plurality of pore forming particles comprising an organic polymer and a plurality of inorganic particles, the inorganic particles comprising at least one inorganic material selected from the group consisting of a nitride ceramic, a carbide ceramic, an oxide ceramic, a metal and a metal compound;
forming a mixture of a plurality of skeleton particles and the plurality of pore forming particles, the skeleton particles comprising a ceramic selected from the group consisting of a nitride ceramic, a carbide ceramic and an oxide ceramic, the ceramic of the skeleton particles being different from the inorganic compound of the inorganic compound components;
forming the mixture into a molded body; and
firing the molded body in a temperature range sufficiently high for a sufficient duration such that skeleton particles directly bind with each other and form inner surfaces and void spaces and that the inorganic particles of the pore forming particles form a plurality of inorganic compound components present on the inner surfaces formed by the skeleton particles directly bound with each other.

8. A honeycomb structure comprising:
a porous ceramic body having a plurality of through holes extending in parallel in a longitudinal direction of the porous ceramic body and a plurality of partitions separating the through holes from each other,
wherein the porous ceramic body is produced by calcining a molded body comprising a mixture including a plurality of skeleton particles and a plurality of pore forming particles comprising an organic polymer and a plurality of inorganic particles, the molded body is calcined in a temperature range sufficiently high for a sufficient duration such that the skeleton particles directly bind with each other and form inner surfaces and void spaces and that the inorganic particles of the pore forming particles form a plurality of inorganic compound components present on the inner surfaces formed by the skeleton particles directly bound with each other and comprising an inorganic compound, each of the skeleton particles comprises a ceramic selected from the group consisting of a nitride ceramic, a carbide ceramic and an oxide ceramic, the plurality of inorganic particles comprises at least one inorganic material selected from the group consisting of a nitride ceramic, a carbide ceramic, an oxide ceramic, a metal and a metal compound, and the ceramic of the skeleton particles is different from the inorganic compound of the inorganic compound components.

9. The honeycomb structure according to claim 8, wherein the ceramic porous body has a porosity which is at least about 45% and at most about 85%.

10. The honeycomb structure according to claim 8, wherein the void spaces have a major axis which is equal to or larger than a major axis of the skeleton particles.

11. The honeycomb structure according to claim 10, wherein the plurality of skeleton particles comprises silicon carbide particles and the plurality of inorganic compound components comprises at least one selected from alumina, mullite, silica, titania, and silica alumina.

12. The honeycomb structure according to claim 10, wherein the inorganic compound components are bound on neck portions of the skeleton particles.

13. The honeycomb structure according to claim 10, wherein the inorganic compound components are crystallized from a liquid phase and are bound on neck portions of the skeleton particles.

14. A honeycomb structure produced by the process comprising the steps of:
preparing a plurality of pore forming particles comprising an organic polymer and a plurality of inorganic particles, the inorganic particles comprising at least one inorganic material selected from the group consisting of a nitride ceramic, a carbide ceramic, an oxide ceramic, a metal and a metal compound;
forming a mixture of a plurality of skeleton particles and the plurality of pore forming particles, the skeleton particles comprising a ceramic selected from the group consisting of a nitride ceramic, a carbide ceramic and an oxide ceramic, the ceramic of the skeleton particles being different from the inorganic compound of the inorganic compound components;
forming a molded body from the mixture; and
firing the molded body in a temperature range sufficiently high for a sufficient duration such that skeleton particles directly bind with each other and form inner surfaces and void spaces and that the inorganic particles of the pore forming particles form a plurality of inorganic compound components present on the inner surfaces formed by the skeleton particles directly bound with each other.

15. A porous body comprising:
a ceramic body produced by calcining a molded body comprising a mixture including a plurality of skeleton particles, a binding substance for binding the skeleton particles, and a plurality of pore forming particles comprising an organic polymer and a plurality of inorganic particles,
wherein the molded body is calcined in a temperature range sufficiently high for a sufficient duration such that the skeleton particles directly bind with each other and form inner surfaces and void spaces and that the inorganic particles of the pore forming particles form a plurality of inorganic compound components present on the inner surfaces formed by the skeleton particles directly bound with each other and comprising an inorganic compound, each of the skeleton particles comprises a ceramic selected from the group consisting of a nitride ceramic, a carbide ceramic and an oxide ceramic, the plurality of inorganic particles comprises at least one inorganic material selected from the group consisting of a nitride ceramic, a carbide ceramic, an oxide ceramic, a metal and a metal compound, and the ceramic of the skeleton particles is different from the inorganic compound of the inorganic compound components.

16. The porous body according to claim 15, wherein a porosity of the porous body is at least about 45% and at most about 85%.

17. The porous body according to claim 15, wherein the void spaces have a major axis which is equal to or larger than a major axis of the skeleton particles.

18. The porous body according to claim 17, wherein the skeleton particles are silicon carbide particles and the inorganic compound includes at least one selected from alumina, mullite, silica, titania, and silica alumina.

19. The porous body according to claim 17, wherein the inorganic compound components are bound on neck portions of the skeleton particles directly bound with each other.

20. The porous body according to claim 17, wherein the inorganic compound components are crystallized from a liquid phase and are bound on neck portions of the skeleton particles.

21. A honeycomb structure comprising:
a porous ceramic body having a plurality of through holes extending in parallel in a longitudinal direction of the porous ceramic body and a plurality of partitions separating the through holes from each other,
wherein the porous ceramic body is produced by calcining a molded body comprising a mixture including a plurality of skeleton particles, a binding substance for binding the skeleton particles, and a plurality of pore forming particles comprising an organic polymer and a plurality of inorganic particles, the molded body is calcined in a temperature range sufficiently high for a sufficient duration such that the skeleton particles directly bind with each other and form inner surfaces and void spaces and that the inorganic particles of the pore forming particles form a plurality of inorganic compound components present on the inner surfaces formed by the skeleton particles directly bound with each other and comprising an inorganic compound, each of the skeleton particles comprises a ceramic selected from the group consisting of a nitride ceramic, a carbide ceramic and an oxide ceramic, the plurality of inorganic particles comprises at least one inorganic material selected from the group consisting of a nitride ceramic, a carbide ceramic, an oxide ceramic, a metal and a metal compound, and the ceramic of the skeleton particles is different from the inorganic compound of the inorganic compound components.

22. The honeycomb structure according to claim 21, wherein the ceramic porous body has a porosity which is at least about 45% and at most about 85%.

23. The honeycomb structure according to claim 21, wherein the void spaces have a major axis which is equal to or larger than a major axis of the skeleton particles.

24. The honeycomb structure according to claim 23, wherein the plurality of skeleton particles comprises silicon carbide particles and the plurality of inorganic compound comprises at least one selected from alumina, mullite, silica, titania, and silica alumina.

25. The honeycomb structure according to claim 23, wherein the inorganic compound components are bound on neck portions of the skeleton particles.

26. The honeycomb structure according to claim 23, wherein the inorganic compound components are crystallized from a liquid phase and are bound on neck portions of the skeleton particles.

* * * * *